(12) United States Patent
Sun et al.

(10) Patent No.: US 11,076,132 B2
(45) Date of Patent: Jul. 27, 2021

(54) METHODS AND SYSTEMS FOR GENERATING VIDEO SYNOPSIS

(71) Applicant: ZHEJIANG DAHUA TECHNOLOGY CO., LTD., Zhejiang (CN)

(72) Inventors: Li Sun, Hangzhou (CN); Huadong Pan, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/901,070

(22) Filed: Jun. 15, 2020

(65) Prior Publication Data

US 2020/0329217 A1 Oct. 15, 2020

Related U.S. Application Data

(63) Continuation of application No. PCT/CN2018/121349, filed on Dec. 15, 2018.

(30) Foreign Application Priority Data

Dec. 15, 2017 (CN) .......................... 201711352114.2

(51) Int. Cl.
*H04N 7/18* (2006.01)
*H04N 5/14* (2006.01)
(Continued)

(52) U.S. Cl.
CPC ............. *H04N 7/181* (2013.01); *H04N 5/144* (2013.01); *H04N 7/183* (2013.01);
(Continued)

(58) Field of Classification Search
CPC ........... G06T 7/80; G06T 7/97; G06T 7/0014; G06T 7/0016; G06T 7/248; G06T 7/254;
(Continued)

(56) References Cited

U.S. PATENT DOCUMENTS 9,607,013 B2 * 3/2017 Kawano .................. G06F 16/58
10,452,713 B2 * 10/2019 Liu ...................... G06F 16/7837
(Continued)

FOREIGN PATENT DOCUMENTS

CN 102231820 A 11/2011
CN 102375816 A 3/2012
(Continued)

OTHER PUBLICATIONS

International Search Report in PCT/CN2018/121349 dated Jan. 31, 2019, 4 pages.
(Continued)

*Primary Examiner* — John W Miller
*Assistant Examiner* — Humam M Satti
(74) *Attorney, Agent, or Firm* — Metis IP LLC

(57) ABSTRACT

The present disclosure provides a system and method for generating a video synopsis. The method may include obtaining a video captured by a movable camera at a plurality of positions, the video including a sequence of video frames; determining, for each of at least part of the sequence of video frames, a position label of the video frame that indicates one of the plurality of positions of the movable camera; classifying the at least part of the sequence of video frames into a plurality of groups based on their position labels; determining one or more objects of interest in at least one of the plurality of groups; generating, for the at least one of the plurality of groups, a video synopsis based on the one or more objects of interest.

20 Claims, 11 Drawing Sheets

(51) Int. Cl.
*H04N 21/258* (2011.01)
*H04N 21/4223* (2011.01)
*H04N 21/8549* (2011.01)

(52) U.S. Cl.
CPC ... *H04N 21/25841* (2013.01); *H04N 21/4223* (2013.01); *H04N 21/8549* (2013.01)

(58) Field of Classification Search
CPC ............ G06T 7/292; G06T 7/30–7/38; G06T 2200/00; G06T 2201/00; G06T 2201/005; G06T 2207/00; G06T 2207/10004; G06T 2207/10016; G06T 2207/30232; G06T 2207/30241; G06T 2207/30244; G06T 2210/00; G06T 2211/00; G06T 2215/00; H04N 21/8549; H04N 7/181–7/188; G06F 16/739; G06F 16/70–16/787
See application file for complete search history.

(56) References Cited

U.S. PATENT DOCUMENTS

| | | | | |
|---|---|---|---|---|
| 2009/0307261 | A1* | 12/2009 | Lindley | G06F 16/48 |
| 2010/0254614 | A1* | 10/2010 | Baker | G06F 16/7867 382/218 |
| 2013/0027551 | A1 | 1/2013 | Peleg et al. | |
| 2014/0003523 | A1* | 1/2014 | Soroushian | H04N 19/577 375/240.16 |
| 2015/0302894 | A1 | 10/2015 | Boiman et al. | |
| 2016/0140423 | A1* | 5/2016 | Lee | G06K 9/00771 382/224 |
| 2016/0224835 | A1* | 8/2016 | Newman | G10L 25/57 |
| 2016/0323658 | A1* | 11/2016 | Richardson | G06K 9/6276 |
| 2017/0094195 | A1 | 3/2017 | Adsumilli et al. | |
| 2017/0094196 | A1* | 3/2017 | Adsumilli | G06T 15/503 |
| 2018/0089832 | A1* | 3/2018 | Liu | G06K 9/00664 |
| 2018/0103197 | A1* | 4/2018 | Campbell | H04W 4/023 |
| 2018/0374233 | A1* | 12/2018 | Zhou | G06T 7/248 |
| 2019/0130641 | A1* | 5/2019 | Barajas Hernandez | G06T 17/20 |
| 2019/0333542 | A1 | 10/2019 | Qin et al. | |

FOREIGN PATENT DOCUMENTS

| | | |
|---|---|---|
| CN | 102930061 A | 2/2013 |
| CN | 103617234 A | 3/2014 |
| CN | 104093001 A | 10/2014 |
| CN | 104320670 A | 1/2015 |
| CN | 105306880 A | 2/2016 |
| CN | 104284057 B | 8/2016 |
| CN | 106162204 A | 11/2016 |
| WO | 03005239 A1 | 1/2003 |
| WO | 2019114835 A1 | 6/2019 |

OTHER PUBLICATIONS

Written Opinion in PCT/CN2018/121349 dated Jan. 31, 2019, 5 pages.
The Extended European Search Report in European Application No. 18889043.8 dated Aug. 5, 2020, 9 pages.

* cited by examiner

500

510 — Obtaining a video captured by a movable camera at a plurality of positions, the video including a sequence of video frames

520 — Determining, for each of at least part of the sequence of video frames, a position label of a video frame that indicates one of the plurality of positions of the movable camera

530 — Classifying the at least part of the sequence of video frames into a plurality of groups based on their position labels

540 — Extracting an index file for each of the plurality of groups, the index file including one or more parameters of an object of interest

550 — For the at least one of the plurality of groups, generating a video synopsis

┌─ 1110
Obtaining video frames (e.g., FGi, i=1, 2, ..., n) belonging to a video frame group and the corresponding index file ↓ 1120
Generating a background to be displayed in a video synopsis based on the video frames (e.g., FGi, i=1, 2, ..., n) belonging to the video frame group and the corresponding index file ↓ 1130
Superposing one or more objects of interest in the video frame group on the background to be displayed in the video synopsis based on the corresponding index file ↓ 1140
Generating the video synopsis for the video frame group

FIG. 11

METHODS AND SYSTEMS FOR GENERATING VIDEO SYNOPSIS

CROSS-REFERENCE TO RELATED APPLICATIONS

This application is a Continuation of International Application No. PCT/CN2018/121349, filed on Dec. 15, 2018, which claims priority of Chinese Application No. 201711352114.2 filed on Dec. 15, 2017, the entire contents of which are hereby incorporated by reference.

TECHNICAL FIELD

The present disclosure generally relates to video processing, and more specifically relates to methods and systems for generating a video synopsis.

BACKGROUND

Video surveillance plays an important role in a security system. Video surveillance can be used in crime prevention, industrial process, traffic monitoring, transport safety, etc. Generally, the time duration of a video captured during the video surveillance is too long for a user to identify one or more moving objects in the video efficiently. To improve the efficiency, a video synopsis technology may be provided to generate a video synopsis based on the one or more moving objects.

Exemplary process of the video synopsis technology may include foreground detection, video synopsizing processing and integration processing. The foreground detection may be used for initial background modeling and moving objects detecting. The video synopsizing processing may be used for extracting a scene of a video frame including one or more moving objects. The integration processing may be mainly used for sorting scenes produced by the video synopsizing processing, and generating a video synopsis based on the sorted scenes and the corresponding video frames.

In the video synopsis, video frames associated with a same moving object in different scenes may be displayed. However, the existing video synopsis technology cannot pick out a specific scene for the object. For example, if the crime scene is about a specific corner of a stairwell, the police may only want to retrieve the video frames associated with the specific corner of the stairwell, but the existing video synopsis technology can hardly meet this requirement.

SUMMARY

In a first aspect of the present disclosure, a system for generating a video synopsis is provided. The system may include at least one storage medium including a set of instructions, and at least one processor in communication with the at least one storage medium. When executing the set of instructions, the at least one processor may be configured to direct the system to: obtain a video captured by a movable camera at a plurality of positions, the video including a sequence of video frames; determine, for each of at least part of the sequence of video frames, a position label of the video frame that indicates one of the plurality of positions of the movable camera; classify the at least part of the sequence of video frames into a plurality of groups based on their position labels; determine one or more objects of interest in at least one of the plurality of groups; generate, for the at least one of the plurality of groups, a video synopsis based on the one or more objects of interest.

In some embodiments, the at least one processor may be further configured to direct the system to: identify, among the sequence of video frames, one or more abnormal video frames; leave the one or more abnormal video frames without determining their position labels.

In some embodiments, to determine a position label of the video frame that indicates one of the plurality of positions of the movable camera for each of at least part of the sequence of video frames, the at least one processor may be configured to direct the system to: determine that the video frame includes a position information indicates one of the plurality of positions of the movable camera; determine the position label of the video frame based on the position information.

In some embodiments, the position information may include a PTZ parameter of the movable camera.

In some embodiments, to determine a position label of the video frame that indicates one of the plurality of positions of the movable camera for each of at least part of the sequence of video frames, the at least one processor may be configured to direct the system to: determine a first matching degree between the video frame and a previous video frame with a defined position label; in response to a determination that the first matching degree satisfies a first condition, designate the defined position label of the previous video frame as the position label of the video frame.

In some embodiments, to determine a position label of the video frame that indicates one of the plurality of positions of the movable camera for each of at least part of the sequence of video frames, the at least one processor may be configured to direct the system to: determine a plurality of second matching degrees between the video frame and a plurality of previous video frames; determine a highest matching degree among the plurality of second matching degrees, the highest matching corresponding to a target video frame among the plurality of previous video frames; in response to a determination that the highest matching degree is greater than a threshold, designate a position label of the target video frame as the position label of the video frame.

In some embodiments, to determine a position label of the video frame that indicates one of the plurality of positions of the movable camera for each of at least part of the sequence of video frames, the at least one processor may be configured to direct the system to: designate a distinctive position label with respect to one or more previous position labels of one or more previous video frames as the position label of the video frame.

In some embodiments, to classify the at least part of the sequence of video frames into a plurality of groups, the at least one processor may be configured to direct the system to: classify one or more video frames with a same position label into one group, or classify one or more video frames whose position labels are close to each other into one group.

In some embodiments, to generate a video synopsis based on the one or more objects of interest for the at least one of the plurality of groups, the at least one processor may be configured to direct the system to: generate one or more background images from the at least one of the plurality of groups, the one or more background images having different brightness levels; superpose the one or more objects of interest on the one or more background images to generate the video synopsis.

In some embodiments, to superpose the one or more objects of interest on the one or more background images to generate the video synopsis, the at least one processor may be configured to direct the system to: extract the one or more objects of interest with a target box or a foreground mask;

superpose an area corresponding to the target box or the foreground mask on the one or more background images.

In a second aspect of the present disclosure, a method for generating a video synopsis is provided. The method may be implemented on a computing device having at least one processor and a non-transitory storage medium. The method may include: obtaining a video captured by a movable camera at a plurality of positions, the video including a sequence of video frames; determining, for each of at least part of the sequence of video frames, a position label of the video frame that indicates one of the plurality of positions of the movable camera; classifying the at least part of the sequence of video frames into a plurality of groups based on their position labels; determining one or more objects of interest in at least one of the plurality of groups; generating, for the at least one of the plurality of groups, a video synopsis based on the one or more objects of interest.

In some embodiments, the method may further include: identifying, among the sequence of video frames, one or more abnormal video frames; leaving the one or more abnormal video frames without determining their position labels.

In some embodiments, to determine a position label of the video frame that indicates one of the plurality of positions of the movable camera for each of at least part of the sequence of video frames, the method may include: determining that the video frame includes a position information indicates one of the plurality of positions of the movable camera; determining the position label of the video frame based on the position information.

In some embodiments, the position information may include a PTZ parameter of the movable camera.

In some embodiments, to determine a position label of the video frame that indicates one of the plurality of positions of the movable camera for each of at least part of the sequence of video frames, the method may include: determining a first matching degree between the video frame and a previous video frame with a defined position label; in response to a determination that the first matching degree satisfies a first condition, designating the defined position label of the previous video frame as the position label of the video frame.

In some embodiments, to determine a position label of the video frame that indicates one of the plurality of positions of the movable camera for each of at least part of the sequence of video frames, the method may include: determining a plurality of second matching degrees between the video frame and a plurality of previous video frames; determining a highest matching degree among the plurality of second matching degrees, the highest matching corresponding to a target video frame among the plurality of previous video frames; in response to a determination that the highest matching degree is greater than a threshold, designating a position label of the target video frame as the position label of the video frame.

In some embodiments, to determine a position label of the video frame that indicates one of the plurality of positions of the movable camera for each of at least part of the sequence of video frames, the method may include: designating a distinctive position label with respect to one or more previous position labels of one or more previous video frames as the position label of the video frame.

In some embodiments, to classify the at least part of the sequence of video frames into a plurality of groups, the method may include: classifying one or more video frames with a same position label into one group, or classifying one or more video frames whose position labels are close to each other into one group.

In some embodiments, to generate a video synopsis based on the one or more objects of interest for the at least one of the plurality of groups, the method may include: generating one or more background images from the at least one of the plurality of groups, the one or more background images having different brightness levels; superposing the one or more objects of interest on the one or more background images to generate the video synopsis.

In some embodiments, to superpose the one or more objects of interest on the one or more background images to generate the video synopsis, the method may include: extracting the one or more objects of interest with a target box or a foreground mask; superposing an area corresponding to the target box or the foreground mask on the one or more background images.

In a third aspect of the present disclosure, a non-transitory computer readable medium may store instructions, the instructions, when executed by at least one processor, the at least one processor may be configured to perform one or more of the following operations. A video captured by a movable camera at a plurality of positions may be obtained. The video may include a sequence of video frames. For each of at least part of the sequence of video frames, a position label of the video frame that indicates one of the plurality of positions of the movable camera may be determined. The at least part of the sequence of video frames may be classified into a plurality of groups based on their position labels. One or more objects of interest in at least one of the plurality of groups may be determined. For the at least one of the plurality of groups, a video synopsis may be generated based on the one or more objects of interest.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for generating a video synopsis according to some embodiments of the present disclosure;

FIG. 11 is a flowchart illustrating an exemplary process for generating a video synopsis according to some embodiments of the present disclosure.

DETAILED DESCRIPTION

Figure 1:
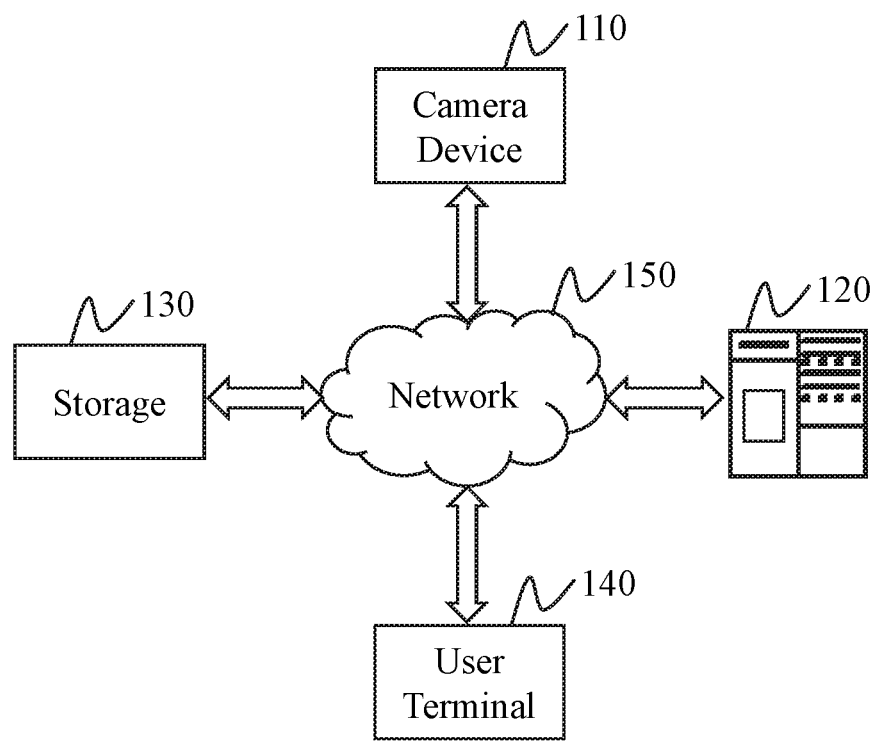
FIG. 1 is a block diagram illustrating an exemplary video processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expression if they achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items. The term "pixel value," "a value of a pixel," or "values of pixels" may be used alternatively. A value of a pixel may refer to a gray value, a RGB value, any other value that can indicate brightness or color of the pixel, etc.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the disclosure describes systems and methods for generating a video synopsis. The system may be configured to obtain a video captured by a movable camera at a plurality of positions. The video may include a sequence of video frames. The system may be configured to determine, for each of at least part of the sequence of video frames, a position label of a video frame that indicates one of the plurality of positions of the movable camera. The system may be configured to classify the at least part of the sequence of video frames into a plurality of groups based on their position labels. The system may be configured to determine one or more objects of interest in at least one of the plurality of groups and generate, for the at least one of the plurality of groups, a video synopsis based on the one or more objects of interest. For persons having ordinary skills in the art, multiple variations or modifications may be made under the teachings of the present disclosure.

The following description is provided to help better understanding video processing methods or systems. The term "video frame" used in this disclosure may refer to a static picture or a still image. The term "video frame" and the term "image" may be used alternatively. This is not intended to limit the scope the present disclosure. For persons having ordinary skills in the art, a certain amount of variations, changes, and/or modifications may be deducted under guidance of the present disclosure. Those variations, changes, and/or modifications do not depart from the scope of the present disclosure.

FIG. 1 is a block diagram illustrating an exemplary video processing system 100 according to some embodiments of the present disclosure. In some embodiments, the video processing system 100 may be used in an intelligent transportation system (ITS), a security system, a transportation management system, a prison system, an astronomical observation system, a monitoring system, or the like, or any combination thereof. In some embodiments, the video processing system 100 may include a 2D camera system, a 3D camera system, a panoramic camera system, a virtual reality (VR) camera system, a web camera system, an instant picture camera system, an electronic eye system, a camcorder system, a thermal imaging device system, a visible imaging device system, an ultrasonic video processing system, a radiological scanning video processing system, or the like, or any combination thereof. In some embodiments, the video processing system 100 may be used for generating a video synopsis for a video according to preset position information of one or more video frames in the video. The preset position information of one or more video frames in the video may correspond to a set of PTZ (pan/tilt/zoom) parameters of a camera device that captures the video.

It should be noted that video processing system 100 described below is merely provided for illustration purposes and not intended to limit the scope of the present disclosure.

As illustrated in FIG. 1, the video processing system 100 may include a camera device 110, a computing device 120, a storage 130, a user terminal 140, and a network 150. In some embodiments, the camera device 110 and the computing device 120 may be integrated as a single device. Alternatively, the camera device 110 may be installed at a remote location from the computing device 120.

The camera device 110 may be configured to capture a video. In some embodiments, the camera device 110 may include a spherical camera. The spherical camera may be an integrated front-end imaging device with a spherical shield. The spherical camera may have an integrated camera including a zoom lens mounted on a pan/tilt structure. The pan/tilt structure may drive the integrated camera including the zoom lens to rotate up and down, left and right, to capture videos of different scenes. As such, the working state of the spherical camera may be controlled by a set of PTZ (pan/tilt/zoom) parameters. Additionally or alternatively, the camera device 110 may include a stereo camera. The stereo camera may include a binocular vision device or a multi-camera. Additionally or alternatively, the camera device 110 may include a digital camera. The digital camera may include a 2D camera, a 3D camera, a panoramic camera, a VR (virtual reality) camera, a web camera, an instant picture camera, or the like, or any combination thereof. The digital camera may be added to or be part of a medical imaging equipment, a night vision equipment, a radar system, a sonar system, an electronic eye, a camcorder, a thermal imaging device, a smartphone, a tablet PC, a laptop, a wearable device (e.g., 3D glasses), an eye of a robot, or the like, or any combination thereof. The digital camera may also include an optical sensor, a radio detector, an artificial retina, a mirror, a telescopes, a microscope, or the like, or any combination thereof.

In some embodiments, the video captured by the camera device 110 may include one or more images (or image frames) of an object of interest. The object of interest may be a moving object or a still object. The object of interest may include a still vehicle, a moving vehicle, a passenger, a traffic light, a traffic sign, a road type, or the like, or any combination thereof. In some embodiments, the camera device 110 may capture the video or the image frames thereof corresponding to a same (or substantially similar) field of view (FOV) or different FOVs. The size of the FOV may be adjusted according to the position of the camera, the orientation of the camera, the time of capturing, or the like, or a combination thereof. In some embodiments, the video captured by the camera device 110 may include different scenes. For example, the orientation of the camera device 110 may be adjusted by the pan/tilt structure when the camera device 110 is capturing the video. Accordingly, the scenes presented in at least some of the image frames of the video may be different from each other.

In some embodiments, the camera device 110 may transmit the captured video or images to the computing device 120, the storage 130, and/or the user terminal 140 via the network 150.

The computing device 120 may be configured to process data and/or generate a control signal for the video processing system 100. In some embodiments, the data may include image data or video data. In some embodiments, the data may be analog or digital. In some embodiments, the computing device 120 may generate a control signal including, for example, a control signal for the camera device 110 to capture a video, a control signal for recognizing an object of interest in an image, a control signal for storing/removing data, a control signal for transmitting data among components of the video processing system 100, or the like, or any combination thereof. In some embodiments, the control signal may be generated based on the data received from the camera device 110, the storage 130, the user terminal 140, or an instruction from a user.

In some embodiments, the computing device 120 may include one or more processors to perform operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, the computing device 120 may include a microprocessor to process a video/image captured by the camera device 110.

In some embodiments, the computing device 120 may acquire image/video data from the camera device 110, the storage 130, and/or the user terminal 140 via the network 150. In some embodiments, the computing device 120 may acquire image/video data from the camera device 110 in real time. In some embodiments, the data and/or video(s) processed by the computing device 120 may be saved to the storage 130.

In some embodiments, the computing device 120 may further include input/output components (not shown) configured to receive information from or output information to the camera device 110, the storage 130, and/or other component(s) of the video processing system 100. In some embodiments, the input/output components may include a keyboard, a liquid crystal display (LCD), a light emitting diode (LED) based display, a flat panel display, a cathode ray tube (CRT), a 3D display, a plasma display panel, a touch screen, a mouse, a remote controller, or the like, or any combination thereof. In some embodiments, the information displayed on the input/output components may include an image, a video, a user interface, a value, a text, control information, a program, software, an algorithm, or the like, or any combination thereof. The image may include an original image, a reconstructed image, a processed image, or the like, or any combination thereof. The user interface may include a user interaction interface, a graphical user interface, a user-defined interface, or the like, or any combination thereof. The control information may include a capture control parameter, a processing parameter, an adjustment parameter, or the like, or any combination thereof.

The storage 130 may be configured to store data from the camera device 110, the computing device 120, the user terminal 140, and/or other component(s) of the video processing system 100. In some embodiments, the storage 130 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, storage 130 may be configured to store one or more programs and/or instructions that may be executed by the processor(s) of the video processing system 100 to perform exemplary methods described in this disclosure. For example, the storage 130 may be configured to store program(s) and/or instruction(s) executed by the processor(s) of the video processing system 100 to capture videos/images, process image data or video data, or display any intermediate result. For example, a ROM may store an algorithm for computing device 120 to process the image(s) and/or video(s).

The user terminal 140 may be configured to receive any information from the camera device 110, the computing device 120, or the storage 130 via the network 150. For example, the user terminal 140 may receive a processed video (e.g., a video synopsis) from the computing device 120. In some embodiments, the user terminal 140 may include a smart phone, a personal computer, a tablet, a laptop, a wearable device (e.g., a smart watch, a pair of smart glasses, or the like), or the like, or a combination thereof. In some embodiments, the user terminal 140 and the computing device 120 may be integrated in one device configured to perform exemplary functions of the user terminal 140 and the computing device 120 disclosed in this disclosure.

The network 150 may be configured to facilitate communications among the components of the video processing system 100 including the camera device 110, the computing device 120, the storage 130, and the user terminal 140. For example, the camera device 110 may transmit the captured image(s) to the computing device 120 via the network 150. As another example, the computer device 120 may transmit data processed and/or generated to the user terminal 140 via the network 150.

In some embodiments, network 150 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone network, a metropolitan area network (MAN), a wide area network (WAN), an internet area network (IAN, or cloud), or the like, or any combination thereof. In some embodiments, the camera device 110, the computing device 120, the storage 130, the user terminal 140, or the network 150 may be connected to or communicate with each other directly or indirectly.

In some embodiments, the camera device 110, the computing device 120, the storage 130, and the user terminal 140 may be integrated as one device. In some embodiments, the functions of the video processing system 100 disclosed in this application may be implemented by the camera device 110, the computing device 120, the storage 130, the user terminal 140, or the network 150, or any combination thereof.

In some embodiments, two or more devices of the camera device 110, the computing device 120, the storage 130 and the user terminal 140 may be integrated as one device. For example, the computing device 120 and the user terminal 140 may be integrated as one device. As another example, the camera device 110 and the computing device 120 may be integrated as one device. In some embodiments, the above devices may be located remotely from each other. Merely by way of example, the computing device 120 may be implemented on a cloud platform (e.g., a cloud computing platform or cloud storing platform). As another example, the user terminal 140 may be controlled by a remote system (e.g., a remote medical system or a remote security system).

It should be understood that, the components of the video processing system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware (e.g., the CPU 220 illustrated in FIG. 2). Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above description of the video processing system 100 is merely provided for the purposes of illustration and not intended to limit the scope of the present disclosure. For persons having ordinary skills in the art, multiple variations or modifications may be made under the teachings of the present disclosure. However, those variations and modifications do not depart from the scope of the present disclosure. For example, an input/output device may be integrated in the computing device 120.

Figure 2:
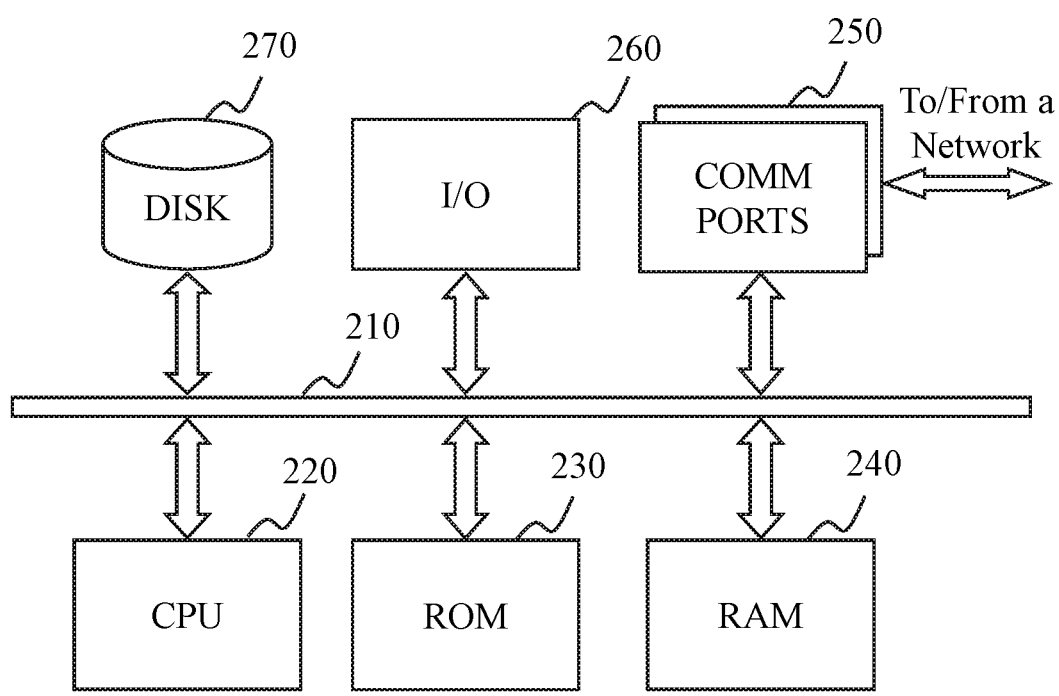
FIG. 2 is a schematic diagram illustrating exemplary hardware and software components of a processing device on which the computing device 120 or the user terminal 140 may be implemented according to some embodiments of the present disclosure.

FIG. 2 is a schematic diagram illustrating exemplary hardware and software components of a processing device 200 on which the computing device 120 or the user terminal 140 may be implemented according to some embodiments of the present disclosure.

The computing device 200 may be a general purpose computer or a special purpose computer. Both may be used to implement a video processing system of the present disclosure. The computing device 200 may be used to implement any component of the service/function as described herein. For example, the computing device 120 of the video processing system 100 may be implemented on the computing device 200, via its hardware, software program, firmware, or a combination thereof. Although only one such computer is shown for convenience, the computer functions related to the video processing system 100 as described herein may be implemented in a distributed manner on a number of similar platforms to distribute the processing load.

The computing device 200, for example, may include COMM ports 250 connected to a network (e.g., the network 150) to facilitate data communications. The computing device 200 may also include a central processing unit (CPU) 220, in the form of one or more processors, for executing program instructions. The computing device 200 may include an internal communication bus 210, program storage and data storage of different forms, for example, a disk 270, and a read only memory (ROM) 230, or a random access memory (RAM) 240, for various data files to be processed and/or transmitted. The computing device 200 may also include program instructions stored in the ROM 230, the RAM 240, and/or other type of non-transitory storage medium to be executed by the CPU 220. The methods and/or processes of the present disclosure may be implemented as the program instructions. The computing device 200 also includes an I/O 260, supporting input/output between the computer and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 executes both step A and step B. As in another example, step A and step B may also be performed by two different CPUs and/or processors in the computing device 200 jointly or separately (e.g., the first processor executes step A, and the second processor executes step B; or the first and second processors jointly execute steps A and B).

Figure 3:
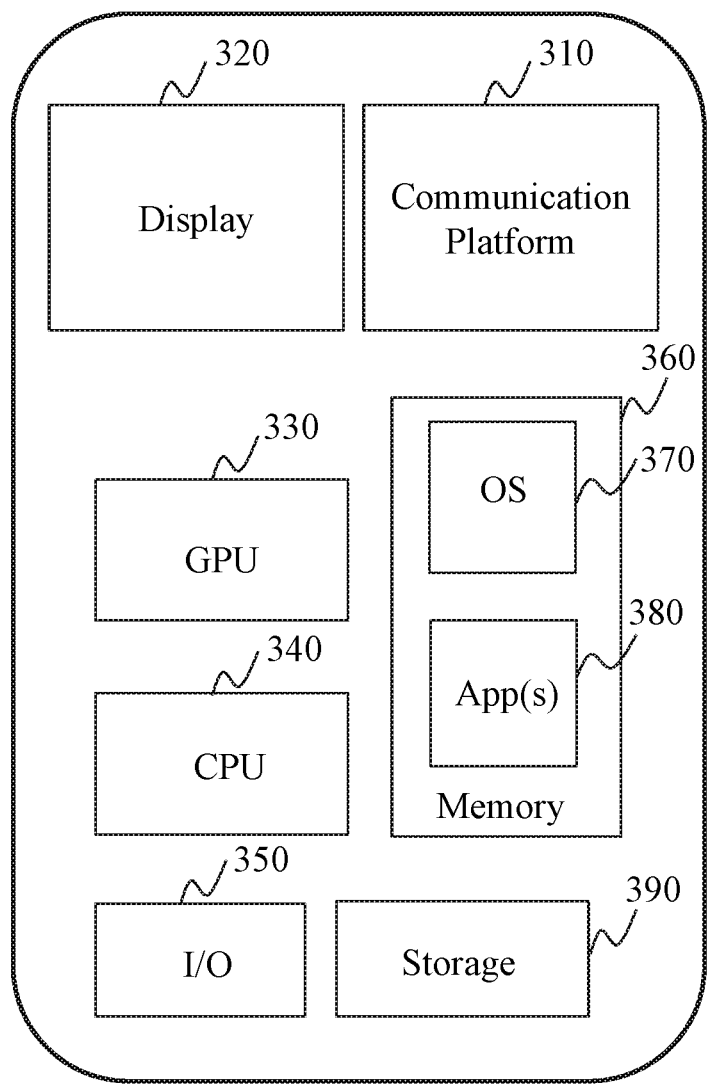
FIG. 3 is a schematic diagram illustrating exemplary hardware and/or software components of an exemplary mobile device on which the user terminal 140 may be implemented according to some embodiments of the present disclosure.

FIG. 3 is a schematic diagram illustrating exemplary hardware and/or software components of an exemplary mobile device 300 on which the user terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the computing device 120. User interactions with the information stream may be achieved via the I/O 350 and provided to the computing device 120 and/or other components of the video processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
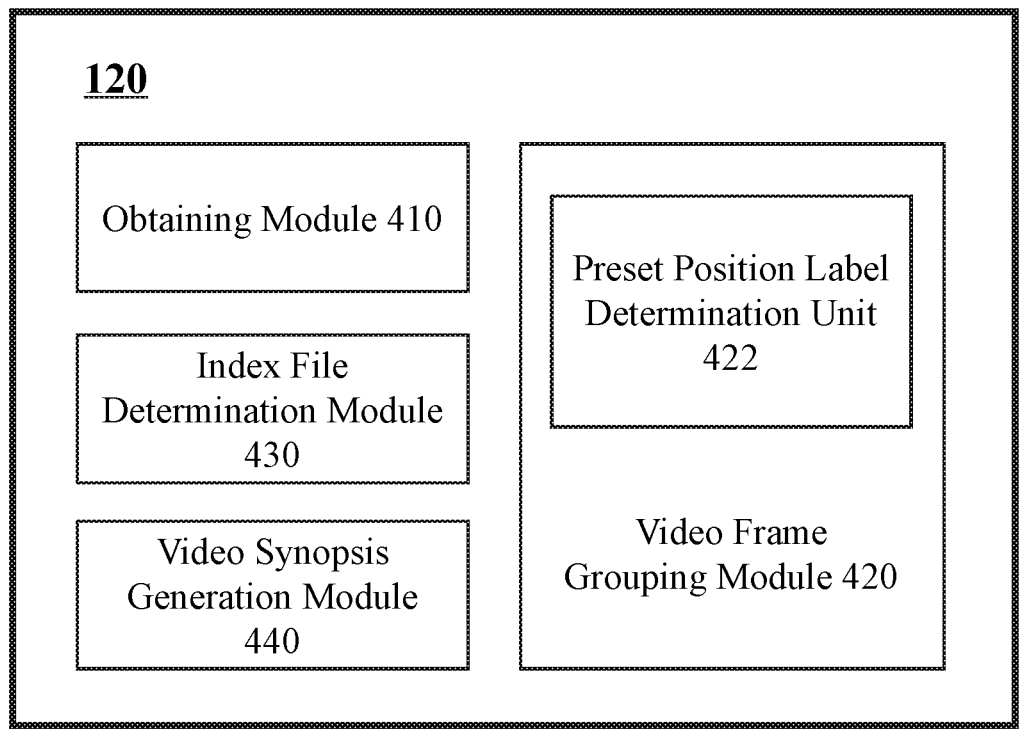
FIG. 4 is a block diagram illustrating an exemplary computing device according to some embodiments of the present disclosure.

FIG. 4 is a block diagram illustrating an exemplary computing device 120 according to some embodiments of the present disclosure. The computing device 120 may include an obtaining module 410, a video frame grouping module 420, an index file determination module 430, and a video synopsis generation module 440. The computing device 120 may be implemented on various components (e.g., the computing device 200 as illustrated in FIG. 2, the mobile device 300 as illustrated in FIG. 3). In some embodiments, the video frame grouping module 420 may further include a preset position label determination unit 422.

The obtaining module 410 may be configured to obtain a sequence of video frames. As used herein, a video frame may be a still image or a static picture. In some embodiments, the sequence of video frames may be included in a video captured by the camera device 110. In some embodiments, the video may be stored in the storage 130, and the obtaining module 410 may obtain the sequence of video frames from the storage 130 via the network 150. In some embodiments, the video may be captured by the camera device 110 in real time, and the obtaining module 410 may directly retrieve the sequence of video frames from the camera device 110 (e.g., the camera device 110) via the network 150 in real time.

The video frame grouping module 420 (e.g., the preset position label determination unit 422) may be configured to determine one or more preset position labels for the sequence of video frames. As used herein, a preset position label for a video frame may correspond to a preset position of the camera (e.g., the camera device 110). In some embodiments, the preset position of the camera may correspond to a set of PTZ (pan/tilt/zoom) parameters of the camera. Specifically, each preset position of the camera may correspond to an orientation of the camera.

In some embodiments, when a video frame carries preset position information at the time it is captured by the camera (e.g., the camera device 110), the one or more preset position labels may be automatically generated by the video frame grouping module 420 (e.g., the preset position label determination unit 422) according to the sequence of video frames. In some embodiments, the video frame grouping module 420 (e.g., the preset position label determination unit 422) may utilize a method illustrated in FIG. 6 to determine of a preset position label of a video frame carrying the preset position information. In some embodiments, a video may not carry preset position information at the time it is captured by the camera. The video frame grouping module 420 (e.g., the preset position label determination unit 422) may utilize a method illustrated in FIG. 7 and FIG. 8 to determine of a preset position label of a video frame without carrying the preset position information.

The video frame grouping module 420 may be configured to generate one or more video frame groups based on the one or more preset position labels of the sequence of video frames. In some embodiments, a video frame group may include the video frames whose preset position labels satisfy a condition. For example, the computing device 120 may gather the video frames with the same preset position label (e.g., preset position label-1) into one video frame group. As another example, the computing device 120 may gather the video frames whose preset position labels are close to each other into one video frame group. As used herein, that two preset position labels are close to each other may denote that the difference between the two preset position labels are smaller than a threshold.

The index file determination module 430 may be configured to extract an index file for each of the one or more video frame groups. The index file may be used to record summary information of each of the one or more video frame groups. The summary information of each of the one or more video frame groups may at least include information of each video frame in each of the one or more video frame groups. In some embodiments, the index file determination module 430 may extract a child index file for each video frame in a video group. The index file determination module 430 may further generate the index file of the video frame group by combining the child index file of each video frame in the video group. A child index file of a video frame may include summary information of the video frame, such as a time stamp, a preset position label, a background, brightness information of the video frame, or the like, or a combination thereof. In some embodiments, the brightness information of the video frame may include a brightness level of the video frame.

In some embodiments, the computing device 120 may determine whether an object of interest is in a video frame. In some embodiments, the computing device 120 may utilize a method illustrated in FIG. 9 and FIG. 10 to determine whether an object of interest is in a video frame. For each video frame including one or more objects of interest, the child index file may further include summary information of each of the one or more objects of interest. In some embodiments, the child index file may include one or more parameters corresponding to each of the one or more objects of interest. The one or more parameters corresponding to an object of interest may include the object ID, the location of the object of interest, the moving direction of the object of interest, the type of the object of interest, the color of the object of interest, the size of the object of interest, etc.

The video synopsis generation module 440 may be configured to generate a video synopsis based on video frames in a video frame group and the index file(s) corresponding to the video frame group. The video synopsis may be an abstraction of the video frames captured by the camera in a same preset position (i.e., in a same video frame group). During the generation of the video synopsis, the video synopsis generation module 440 may arrange the video frames including the plurality of objects of interest according to an arrangement rule. The arrangement rule may be a rule under which the moving paths of the plurality of objects of interest do not overlap with each other, or the plurality of objects of interest in the video synopsis appear simultaneously or successively, or the video synopsis displays as many objects of interest as possible.

It should be noted that the above descriptions of the computing device 120 are provided for the purposes of illustration, and not intended to limit the scope of the present disclosure. For persons having ordinary skills in the art, various modifications and changes in the forms and details of the application of the above method and system may occur without departing from the principles of the present disclosure. Merely by way of example, the computing device 120 may include one or more other modules. However, those variations and modifications also fall within the scope of the present disclosure.

FIG. 5 is a flowchart illustrating an exemplary process 500 for generating a video synopsis according to some embodiments of the present disclosure. In some embodiments, at least part of the process 500 may be performed by the computing device 120 (implemented in, for example, the computing device 200 shown in FIG. 2). For example, the process 500 may be stored in a storage device (e.g., the storage 130, the storage 390, etc.) in the form of instructions (e.g., an application), and invoked and/or executed by the computing device 120 (e.g., the computing device 200 as illustrated in FIG. 2, the mobile device 300 as illustrated in FIG. 3). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the computing device 120 (e.g., the obtaining module 410) may obtain a sequence of video frames. As used herein, a video frame may be a still image or a static picture. In some embodiments, the sequence of video frames may be included in a video captured by the camera device 110. In some embodiments, the video may be stored in the storage 130, and the computing device 120 may obtain the sequence of video frames from the storage 130 via the network 150. In some embodiments, the video may be captured by the camera device 110 in real time, and the computing device 120 may directly retrieve the sequence of video frames from the camera device 110 (e.g., the camera device 110) via the network 150 in real time.

The sequence of video frames may be consecutive time frames or inconsecutive time frames of the video. The sequence of video frames may last for a time period (e.g., 30 minutes, or from 2:00 pm to 6:00 pm). During the time period, the sequence of video frames may be captured by the camera device 110 in different orientations, such that the sequence of video frames may corresponding to different scenes. The different scenes may correspond to different backgrounds in the video frames. For example, one scene may include a parking entrance of a parking lot, another scene may include one or more parking spaces of the parking lot.

In 520, the computing device 120 (e.g., the video frame grouping module 420) may determine one or more preset position labels for the sequence of video frames. As used herein, a preset position label for a video frame may correspond to a preset position of the camera (e.g., the camera device 110). In some embodiments, the preset position of the camera may correspond to a set of PTZ (pan/tilt/zoom) parameters of the camera. Specifically, each preset position of the camera may correspond to an orientation of the camera.

In some embodiments, the preset position labels may be automatically generated by the computing device 120 according to the sequence of video frames. For example, the computing device 120 may assign the sequence of video frames whose scenes or backgrounds are different with different preset position labels.

In some embodiments, if a user wants to monitor a specific area, he/she may set a specific preset position for the camera that corresponds to the specific area in advance. Thus, the video frames captured by the camera at the specific preset position may have a specific preset position label that corresponds to the specific preset position. For example, the user may set a preset position for the camera device 110 to focus on the specific area through a mobile app of the applications 380 via the user terminal 140. For illustration purpose, the camera device 110 may be installed on the ceiling of an office including 4 desks. A preset position with a preset position label-1 may be set to monitor the doorway area of the office. Preset positions with preset position label-2 to preset position label-5 may be respectively set to monitor each of the 4 desks. In some embodiments, when the user needs to quickly check an area corresponding to a preset position, the user may recall the preset position (or a preset position label) corresponding to the area by activating a recalling command through the mobile app of the applications 380 via the user terminal 140. For example, when the user needs to quickly look through the doorway area of the office, the user may recall the preset position (or the preset position label-1) corresponding to the doorway area of the office by activating a recalling command via the user terminal 140. In some embodiments, the recalling command may be transmitted to the camera device 110 or the computing device 120 via the network 150.

In some embodiments, the relationship between a preset position (of the camera) and the corresponding preset position label may be stored in a storage of the camera device 110, a storage of the user terminal 140, or a storage of the computing device 120. When a user needs to quickly look through a specific area within the monitoring range of the camera device 110, the user may select the preset position corresponding to the specific area and send an instruction to retrieve the video frames corresponding to the preset position. Then, in response to receiving the instruction, the computing device 120 may identify the videos frames with the corresponding preset position label based on the stored relationship. For example, when a user needs to quickly look through a doorway area of the office, the user may select the preset position corresponding to the doorway area of the office. Then, the computing device 120 may identify out the video frames with the corresponding preset position label.

In some embodiments, a video frame may carry preset position information at the time it is captured by the camera. For example, if the position of the camera when capturing a video frame is a preset position, or one or more previous video frames captured by the camera at the same position have a preset position label, the video frame may be regarded as a video frame carrying preset position information. More descriptions of the determination of the preset position label of a video frame carrying the preset position information may be found in FIG. 6, and the descriptions thereof. In some embodiments, a video may not carry preset position information at the time it is captured by the camera. More descriptions of the determination of the preset position label of a video frame without the preset position information may be found in FIG. 7 and FIG. 8, and the descriptions thereof.

In 530, the computing device 120 (e.g., the video frame grouping module 420) may generate one or more video frame groups based on the one or more preset position labels of the sequence of video frames.

In some embodiments, a video frame group may include the video frames whose preset position labels satisfy a condition. For example, the computing device 120 may gather the video frames with the same preset position label (e.g., preset position label-1) into one video frame group. As another example, the computing device 120 may gather the video frames whose preset position labels are close to each other into one video frame group. As used herein, that two preset position labels are close to each other may denote that the difference between the two preset position labels are smaller than a threshold. Specifically, assuming that the preset position labels are represented by the series numbers 1, 2, 3, . . . , etc., if the difference between two series numbers are smaller than a threshold value (e.g., 3), the video frames corresponding to the two series numbers may be gathered into one video frame group.

In 540, the computing device 120 (e.g., the index file determination module 430) may extract an index file for each of the one or more video frame groups. The index file may be used to record summary information of each of the one or more video frame groups. The summary information of each of the one or more video frame groups may at least include information of each video frame in each of the one or more video frame groups. In some embodiments, the computing device 120 may extract a child index file for each video frame in a video group. The computing device 120 may further generate the index file of the video frame group by combining the child index file of each video frame in the video group. A child index file of a video frame may include summary information of the video frame, such as a time stamp, a preset position label, a background, brightness information of the video frame, or the like, or a combination thereof. In some embodiments, the brightness information of the video frame may include a brightness level of the video frame. The brightness level of the video frame may be determined based on the values of at least part of the pixels in the video frame. More descriptions about the brightness level of a video frame may be found in FIG. 7 and FIG. 8, and the descriptions thereof.

In some embodiments, the computing device 120 may determine whether an object of interest is in a video frame. An object of interest may include a vehicle, a boat, a flying machine, a person, an animal, etc. Detailed descriptions of determining an object of interest in a video frame may be found in FIG. 9 and FIG. 10, and the descriptions thereof. For each video frame including one or more objects of interest, the child index file may further include summary information of each of the one or more objects of interest. In some embodiments, the child index file may include one or more parameters corresponding to each of the one or more objects of interest. The one or more parameters corresponding to an object of interest may include the object ID, the location of the object of interest, the moving direction of the object of interest, the type of the object of interest, the color of the object of interest, the size of the object of interest, etc.

In some embodiments, the computing device 120 may further group the child index files in each video frame group into different categories. For example, a specific category of child index files in a video frame group may include the child index files that include a same object of interest (e.g., with the same object ID). As such, the child index files in the specific category may be combined to form an index file that indicates a moving path of the object of interest with the same object ID. In some embodiments, the index file(s) of each of the one or more video frame groups may be stored in the storage 130, the memory 360 or any storage disclosed elsewhere in the present disclosure.

In 550, the computing device 120 (e.g., the video synopsis generation module 440) may generate, for each of the one or more video frame groups, a video synopsis based on video frames in the video frame group and the index file(s) corresponding to the video frame group. The video synopsis may be an abstraction of the video frames captured by the camera in a same preset position. The scene in the video synopsis may be focused on a specified area associated with the preset position of the camera. In some embodiments, the video synopsis may include a plurality of objects of interest. During the generation of the video synopsis, the computing device 120 may arrange the video frames including the plurality of objects of interest according to an arrangement rule. The arrangement rule may be a rule under which the moving paths of the plurality of objects of interest do not overlap with each other, or the plurality of objects of interest in the video synopsis appear simultaneously or successively, or the video synopsis displays as many objects of interest as possible. More descriptions of generating a video synopsis for a video frame group may be found in FIG. 11, and the descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations may be added between operation 510 and operation 520, or elsewhere in the exemplary process illustrated in FIG. 5. Examples of such operations may include storing or caching the sequence of video frames, the one or more video frame groups, the index file(s), etc.

Figure 6:
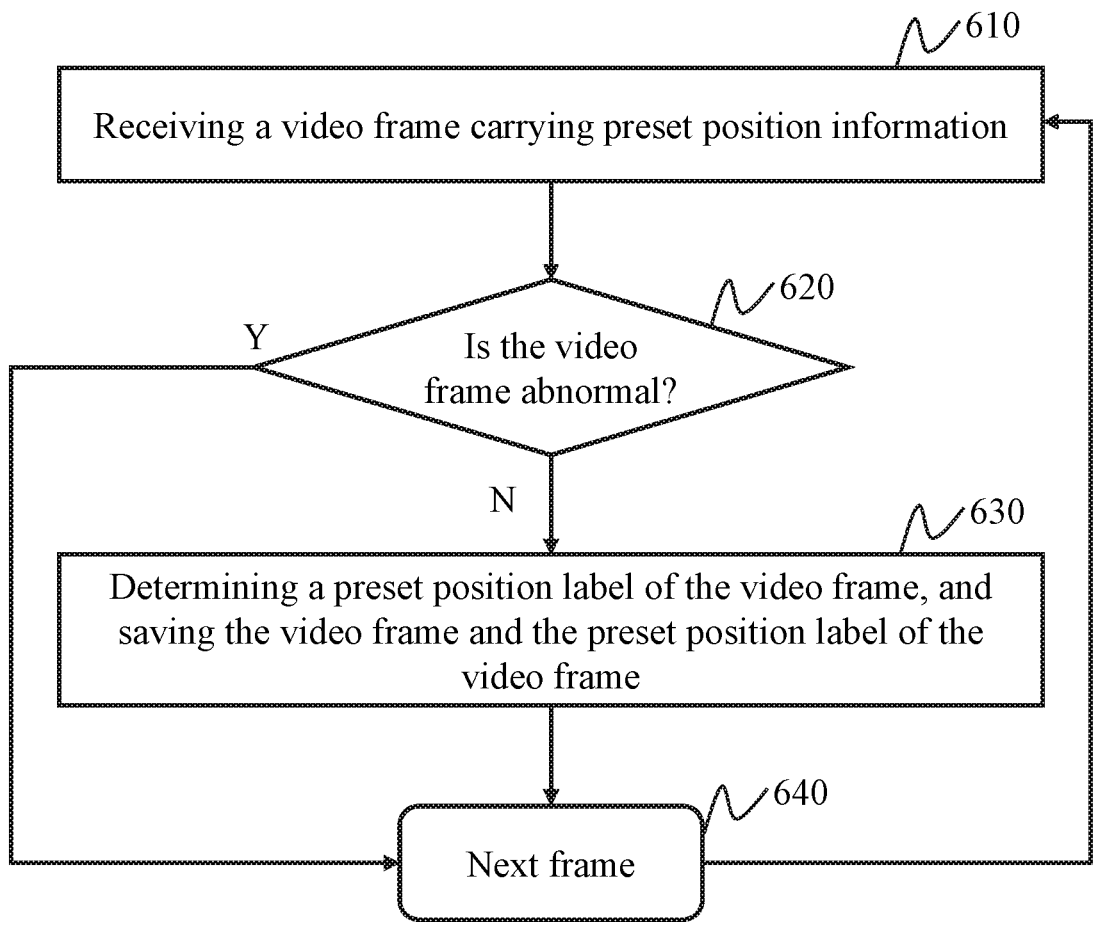
FIG. 6 is a flowchart illustrating an exemplary process for determining one or more preset position labels for a sequence of video frames carrying preset position information according to some embodiments of the present disclosure.

FIG. 6 is a flowchart illustrating an exemplary process for determining one or more preset position labels for a sequence of video frames carrying preset position information according to some embodiments of the present disclosure. In some embodiments, at least part of the process 600 may be performed by the computing device 120 (implemented in, for example, the computing device 200 shown in FIG. 2). For example, the process 600 may be stored in a storage device (e.g., the storage 130, the storage 390, etc.) in the form of instructions (e.g., an application), and invoked and/or executed by the computing device 120 (e.g., the computing device 200 illustrated in FIG. 2, the mobile device 300 illustrated in FIG. 3). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, the computing device 120 may receive a video frame carrying preset position information. The video frame may be one of the sequence of video frames obtained in operation 510 described in FIG. 5. The preset position information of the video frame may indicate that the video frame is captured by the camera in a preset position. In some embodiments, the preset position information may include the preset position label as described above, or any other parameter that is associated with the preset position of the camera and recognizable to the computing device 120. In some embodiments, the computing device 120 may recognize the preset position information of the video frame through a program designed by Python, OpenCV, etc.

In 620, the computing device 120 may determine whether the video frame is abnormal. An abnormal video frame may have an abnormal definition (e.g., image blur, focus blur, etc.), black screen or blue screen caused by missing video signal(s), an abnormal brightness (e.g., too dark, too bright, flickering, etc.), single color deviation or mixed color deviation, or snowflake, or the like, or any combination thereof. In some embodiments, the computing device 120 may determine whether the video frame is abnormal based on the values of at least part of the pixels in the video frame. For example, the computing device 120 may calculate a mean value and a variance value of the values of the pixels in the video frame. If the mean value of the pixels in the video frame is lower than a first threshold and the variance value of the pixels of the video frame is lower than a second threshold, the computing device 120 may determine that the video frame is abnormal. Otherwise, the computing device 120 may determine that the video frame is normal. The first threshold and/or the second threshold may be set by a user through the user terminal 140, or be automatically determined by the computing device 120. In some embodiments, before performing the calculation related to the values of the pixels in the video frame, the computing device 120 may preprocess the video frame by, for example, performing a noise reduction, a Laplace transform, and/or a statistical transformation on the video frame. Then, the calculation described above may be performed on the preprocessed video frames. In response to the determination that the video frame is abnormal, the process 600 may proceed to 640. In response to the determination that the video frame is normal, the process 600 may proceed to 630.

In 630, the computing device 120 may determine a preset position label of the normal video frame. The computing device 120 may exact the preset position information of the normal video frame and designate a preset position label to the video frame. In some embodiments, in the case that the preset position information of the normal video frame includes the preset position label, the computing device 120 may directly designate the preset position label in the preset position information as the preset position label of the normal video frame. Alternatively, the computing device 120 may process the preset position information of the normal video frame to generate the preset position label of the normal video frame. The processing of the preset position information of the normal video frame may include comparing the preset position information of the normal video frame with one or more pre-stored information indicating the relationship between the preset position information and the preset position labels.

In some embodiments, the computing device 120 may also set a video frame label to the normal video frame. For example, the normal video frame may be set with a video frame label VF-5 besides a preset position label-3. Further, the computing device 120 may save the normal video frame, the corresponding video frame label, and/or the corresponding preset position label to the storage 130, the memory 360, or any storage disclosed elsewhere in the present disclosure.

In 640, the computing device 120 may retrieve a next video frame. The next video frame may be a video frame next to the video frame (i.e., the one obtained in operation 610) in the sequence of video frames. Then, the computing device 120 may repeat operations 610 to 640 until all the video frames in the sequence of video frames are processed.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations may be added between operation 610 and operation 620, or elsewhere in the process illustrated in FIG. 6. Examples of such operations may include obtaining the first threshold and/or the second threshold, etc.

Figure 7:
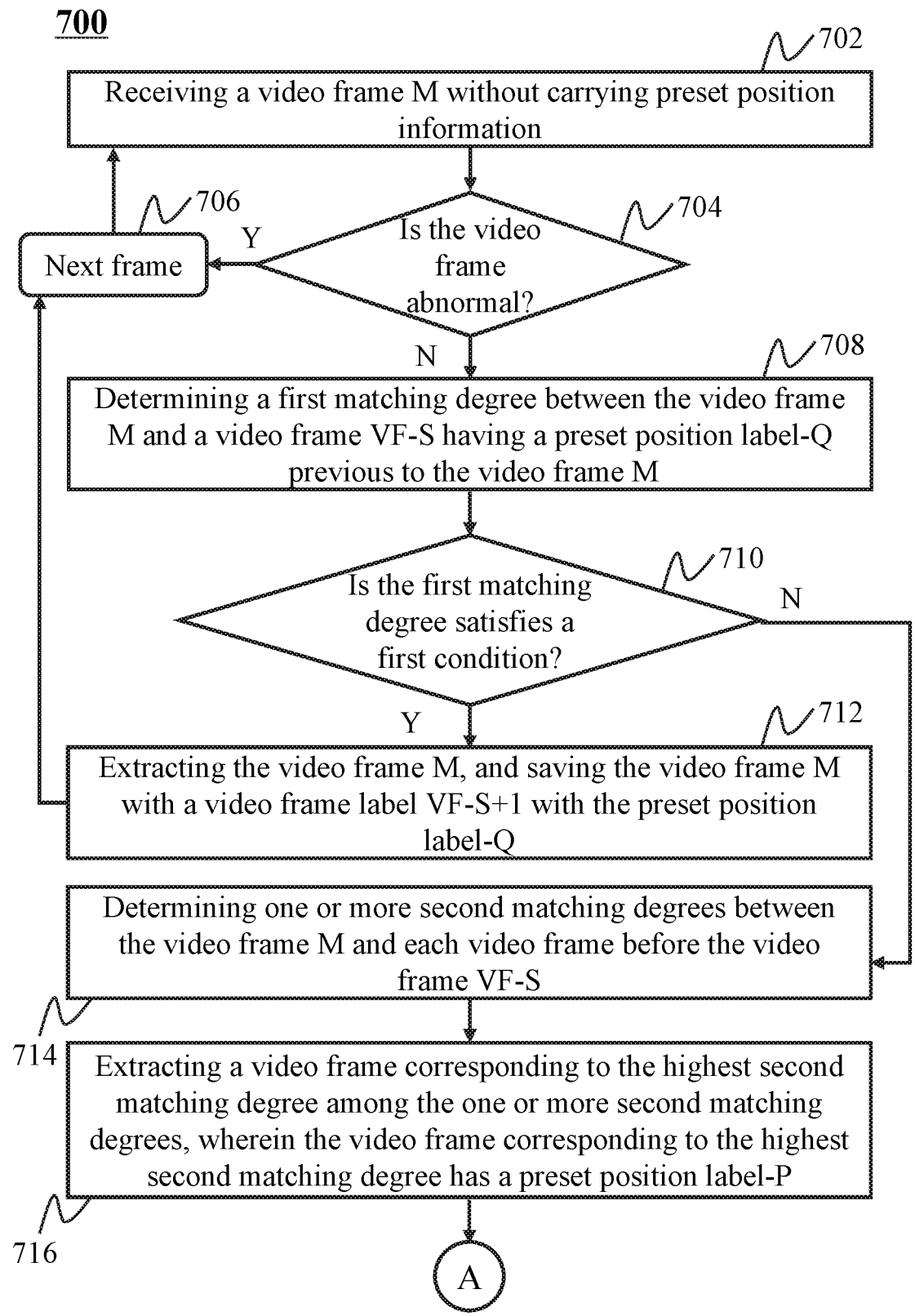
FIG. 7 and FIG. 8 are flowcharts illustrating an exemplary process for determining one or more preset position labels for a sequence of video frames without preset position information according to some embodiments of the present disclosure.
Figure 8:
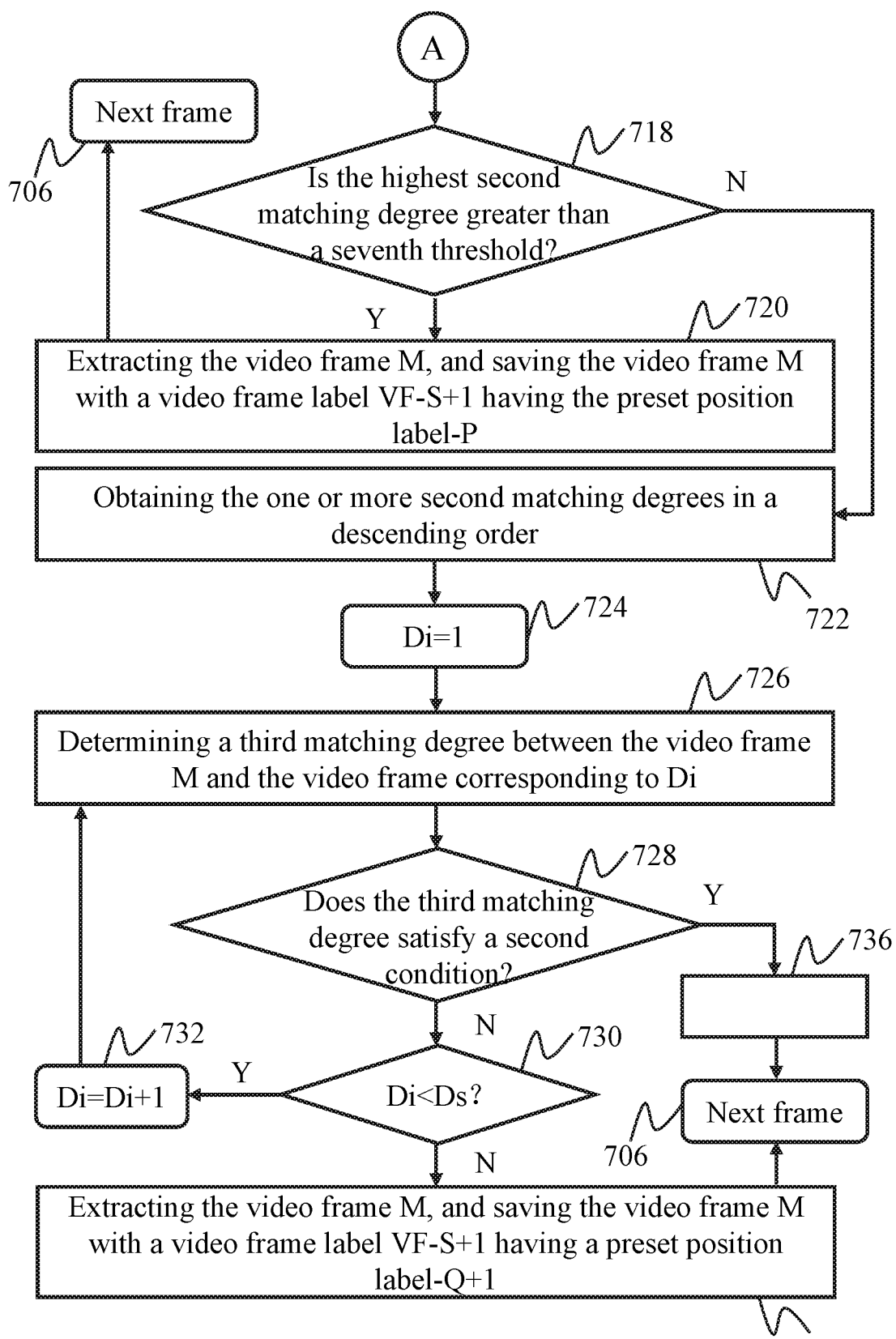

FIG. 7 and FIG. 8 are flowcharts illustrating an exemplary process for determining one or more preset position labels for a sequence of video frames without preset position information according to some embodiments of the present disclosure. In some embodiments, at least part of the process 700 may be performed by the computing device 120 (implemented in, for example, the computing device 200 shown in FIG. 2). For example, the process 700 may be stored in a storage device (e.g., the storage 130, the storage 390, etc.) in the form of instructions (e.g., an application), and invoked and/or executed by the computing device 120 (e.g., the computing device 200 as illustrated in FIG. 2, the mobile device 300 as illustrated in FIG. 3). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and FIG. 8 and described below is not intended to be limiting.

In 702, the computing device 120 may receive a video frame M without preset position information. The video frame M may be one of the sequence of video frames obtained in operation 510 described in FIG. 5. That the video frame M without preset position information may denote that the position of the camera, when capturing the video frame M, is not a preset position. M may be a serial number of the video frame in the sequence of video frames. For example, when M=1, the video frame M may be the first video frame of the sequence of video frames, and at the time the video frame M is captured, no preset position has been set by the computing device 120. As another example, the video frame M may correspond to a position of the camera which is different from any preset position of the camera. Specifically, the video frame M may correspond to a set of PTZ parameters of the camera that is different from the preset PTZ parameters of any previous video frame.

In 704, the computing device 120 may determine whether the video frame M is abnormal. Similar to the operation 620 described in FIG. 6, the computing device 120 may also determine whether the video frame is abnormal based on values of at least part of pixels of the video frame. For example, the computing device 120 may calculate a mean value and a variance value of the values of the pixels in the video frame. If the mean value of the pixels in the video frame is lower than a first threshold and the variance value of the pixels of the video frame is lower than a second threshold, the computing device 120 may determine that the video frame is abnormal. Otherwise, the computing device 120 may determine that the video frame is normal. The first threshold and/or the second threshold may be set by a user through the user terminal 140, or be automatically determined by the computing device 120. In some embodiments, before performing the calculation related to the values of the pixels in the video frame, the computing device 120 may preprocess the video frame by, for example, performing a noise reduction, a Laplace transform, and/or a statistical transformation on the video frame. Then, the calculation described above may be performed on the preprocessed video frames. In response to the determination that the video frame M is abnormal, process 700 may proceed to 706. In response to the determination that the video frame is normal, process 700 may proceed to 708.

In some embodiments, the computing device 120 may set the first normal video frame (e.g., the video frame 1) in the sequence of video frames as video frame VF-1 with preset position label-1.

In 706, the computing device 120 may retrieve a next video frame. The next video frame may be a video frame next to the video frame M in the sequence of video frames. The computing device 120 may replace the video frame M with the next video frame in 702 and repeat operations 702 to 704.

In 708, the computing device 120 may determine a first matching degree between the video frame M and a video frame VF-S previous to the video frame M. The video frame VF-S may be the last normal video frame before the video frame M. The video frame VF-S may have a preset position label-Q.

The first matching degree between the video frame M and the video frame VF-S may indicate a similarity between the two video frames. In some embodiments, the first matching degree between the video frame M and the video frame VF-S may be determined by a histogram matching technique. For example, the computing device 120 may generate a histogram for the video frame M and a histogram for the video frame VF-S. The histogram of the video frame M may be generated based on the values of pixels in the video frame M. The horizontal axis of the histogram may indicate one or more pixel value ranges (e.g., 0~24, 25~49, 50~74), and the vertical axis of the histogram may indicate the number of pixel(s) falling into each of the one or more pixel value ranges (e.g., there are 62 pixels falling into a pixel value range of 25-49). Similar to the video frame M, the computing device 120 may generate the histogram for the video frame VF-S, and the horizontal axis of the histogram of the video frame VF-S may be same as that of the video frame M. In other words, the one or more pixel value ranges of the histogram of the video frame VF-S may be same as that of the video frame M. Further, the computing device 120 may determine a difference value between the histogram of the video frame M and the histogram of the video frame VF-S, which may indicate the first matching degree between the video frame M and the video frame VF-S. In some embodiments, the difference value between the histogram of the video frame M and the histogram of the video frame VF-S may refer to a mean value or a variance value of one or more differences. Each of the one or more differences may refer to a number difference of pixel(s) falling into a same pixel value range in the video frame M and the video frame VF-S.

Another exemplary histogram matching technique is described herein for the purpose of illustration, and not intended to limit the scope of the present disclosure.

Firstly, the computing device 120 may calculate difference values between a plurality of pairs of pixels in the video frame M and the video frame VF-S. As used herein, a pair of pixels may include two pixels with a same pixel coordinate in the video frame M and the video frame VF-S. For brevity, the video frame M and the video frame VF-S may both include 256×256 pixels, and there may be 256×256 pairs of pixels in the video frame M and the video frame VF-S. A difference value may be determined between the pixel values of each pair of pixels. For example, a difference value may be determined between the pixel (2, 3) in the video frame M and the pixel (2, 3) in the video frame VF-S. The computing device 120 may discard the pixel(s) whose difference value with its corresponding pixel in the pair of pixels is greater than or equal to a fourth threshold, and store the remaining pixels in the video frame M to the storage 130, or the memory 360, or any storage disclosed elsewhere in the present disclosure.

Secondly, the computing device 120 may divide the video frame M and the video frame VF-S into blocks. For example, the computing device 120 may divide the video frame M (256×256 pixels) into 4 blocks (e.g., block M1 including pixels with coordinates from (1, 1) to (128, 128), block M2 including pixels with coordinates from (1, 129) to (129, 256), block M3 including pixels with coordinates from (129, 1) to (256, 129), and block M4 including pixels with coordinates from (129, 129) to (256, 256)), and each block of the video frame M may include 128×128 pixels. The computing device 120 may also divide the video frame VF-S into 4 blocks (e.g., block S1 including pixels with coordinates from (1, 1) to (128, 128), block S2 including pixels with coordinates from (1, 129) to (129, 256), block S3 including pixels with coordinates from (129, 1) to (256, 129), and block S4 including pixels with coordinates from (129, 129) to (256, 256)), and each block of the video frame VF-S may include 128×128 pixels.

Thirdly, the computing device 120 may generate a histogram for each of the blocks (e.g., block M1 to block M4, and/or block S1 to block S4). When generating the histogram for each of the blocks of the video frame M, the computing device 120 may discard the pixel(s) in the video frame M whose difference value with its corresponding pixel is greater than or equal to the fourth threshold. In some embodiments, if more than 80% (or any other suitable values) pixels in a block are discarded, the computing device 120 may discard the block and not generate a histogram for the block.

Fourthly, the computing device 120 may determine a difference value between histograms of remaining blocks in the video frame M and the video frame VF-S. The histogram of a remaining block in the video frame M may be generated based on the values of pixels of the remaining block in the video frame M. The horizontal axis of the histogram may indicate one or more pixel value ranges (e.g., 0~24, 25~49, 50~74, . . . ), and the vertical axis of the histogram may indicate the number of pixel(s) falling into each of the one or more pixel value ranges (e.g., there are 29 pixels falling into a pixel value range of 25~49). Similarly, the computing device 120 may generate a histogram for the corresponding remaining block in the video frame VF-S, and the one or more pixel value ranges of the histogram of the corresponding remaining block in the video frame VF-S may be same as that of the video frame M. Further, the computing device 120 may determine a difference value between the remaining block in the video frame M and the corresponding remaining block in the video frame VF-S. The difference value between the remaining block in the video frame M and the corresponding remaining block in the video frame VF-S may include to a mean value or a variance value of one or more differences. Each of the one or more differences may refer to a number difference of pixel(s) falling into a same pixel value range in the remaining block of the video frame M and the corresponding remaining block of the video frame VF-S. The determination of the difference value above is described herein for the purpose of illustration, and not intended to limit the scope of the present disclosure.

When a difference value between a histogram of a remaining block in the video frame M and a histogram of a corresponding remaining block in the video frame VF-S is lower than a fifth threshold, the computing device 120 may determine that the remaining block in the video frame M matches the corresponding remaining block in the video frame VF-S. Otherwise, the computing device 120 may determine that the remaining block in the video frame M mismatches the corresponding remaining block in the video frame VF-S. In some embodiments, the fifth threshold may be set by a user or automatically determined by the computing device 120.

Finally, the computing device 120 may calculate a ratio of the number of matched blocks to the number of all blocks of the video frame M (or the video frame VF-S), which may indicate the first matching degree between the video frame M and the video frame VF-S.

In 710, the computing device 120 may determine whether the first matching degree satisfies a first condition. In the case that the first matching degree is indicated by the difference value between the histogram of the video frame M and the histogram of the video frame VF-S, the computing device 120 may determine whether the difference value between the histogram of the video frame M and the histogram of the video frame VF-S is lower than a third threshold. Specifically, when the difference value between the histogram of the video frame M and the histogram of the video frame VF-S is lower than the third threshold, the computing device 120 may determine that the video frame M matches the video frame VF-S. Otherwise, the computing device 120 may determine that the video frame M mismatches the video frame VF-S. In the case that the first matching degree is indicated by the ratio of the number of matched blocks to the number of all blocks of the video frame M, the computing device 120 may determine whether the ratio is greater than a sixth threshold. Specifically, when the ratio of the number of matched blocks to the number of all blocks of the video frame M (or the video frame VF-S) is greater than the sixth threshold, the computing device 120 may determine that the video frame M matches the video frame VF-S. Otherwise, the computing device 120 may determine that the video frame M mismatches the video frame VF-S. In response to the determination that the first matching degree satisfies the first condition, the process 700 may proceed to 712. In response to the determination that the first matching degree does not satisfy the first condition, the process 700 may proceed to 714. In some embodiments, the third threshold and/or the sixth threshold may be set by a user through the user terminal 140. In some embodiments, the third threshold and/or the sixth threshold may be automatically determined by the computing device 120.

In 712, the computing device 120 may extract the video frame M. The computing device 120 may assign the video frame M with a video frame label VF-S+1. The computing device 120 may also assign the video frame M with the preset position label-Q, which is same as that of the video frame VF-S.

In 714, the computing device 120 may determine one or more second matching degrees between the video frame M and one or more video frame before the video frame VF-S. Each of the one or more video frame before the video frame VF-S may be a normal video frame and have a preset position label.

In some embodiments, the computing device 120 may determine the one or more second matching degrees by employing a same technique as determining the first matching degree. For example, the one or more second matching degrees may include one or more difference values between the histogram of the video frame M and a histogram of each video frame before the video frame VF-S. As another example, the one or more second matching degrees may include one or more ratios related to the number of matched blocks between the video frame M and the one or more video frames before the video frame VF-S and the number of all blocks of the video frame M (or one or more video frames before the video frame VF-S).

In some embodiments, the computing device 120 may determine the one or more second matching degrees between the video frame M and each video frame before the video frame VF-S by employing other techniques including, a SAD (sum of absolute differences) technique, a SSD (sum of squared differences) technique, a MSD (mean square differences) technique, a NCC (normalized cross correlation) technique, a SSDA (sequential similarity detection algorithm) technique, a SATD (sum of absolute transformed difference) technique, etc.

In 716, the computing device 120 may determine a video frame corresponding to the highest second matching degree among the one or more second matching degrees. For brevity, the video frame corresponding to the highest second matching degree may have a preset position label-P. After the operation 716, the process 700 may proceed to node A and perform at least some operations as illustrated in FIG. 8.

Referring to FIG. 8, in 718, the computing device 120 may determine whether the highest second matching degree is greater than a seventh threshold. In response to the determination that the highest second matching degree is greater than the seventh threshold, the process 700 may proceed to 720. Otherwise, the process 700 may proceed to 722. The seventh threshold may be set by a user through the user terminal 140 or automatically determined by the computing device 120.

In 720, the computing device 120 may extract the video frame M. The computing device 120 may assign the video frame M with a video frame label VF-S+1. The computing device 120 may also assign the video frame M with the preset position label-P, which is same as that of the video frame corresponding to the highest second matching degree. After operation 720, the computing device 120 may retrieve a next video frame and the process 700 may return back to operation 706.

In 722, the computing device 120 may obtain the one or more second matching degrees in a descending order. For brevity, each of the one or more second matching degrees in the descending order may be assigned with a sequence number Di, Di=1, 2, . . . , Ds. The computing device 120 may also obtain the video frames corresponding to the one or more second matching degrees in the descending order.

In 724, the computing device 120 may retrieve a video frame corresponding to a sequence number Di (e.g., Di=1).

In 726, the computing device 120 may determine a third matching degree between the video frame M and the video frame corresponding to the sequence number Di. In some embodiments, the computing device 120 may determine the third matching degree by employing a texture matching technique. Same as that mentioned in operation 708, the computing device 120 may determine difference values between a plurality of pairs of pixels in the video frame M and the video frame corresponding to Di. As used herein, a pair of pixels may include two pixels with a same pixel coordinate in the video frame M and the video frame corresponding to the sequence number Di. A difference value may be determined between the pixel values of each pair of pixels. The computing device 120 may discard the pixel(s) whose difference value with its corresponding pixel in the pair of pixels is greater than or equal to a fourth threshold, and store the remaining pixels in the video frame M and/or the video frame corresponding to Di. to the storage 130, or the memory 360, or any storage disclosed elsewhere in the present disclosure. Further, the computing device 120 may determine a first horizontal gradient value and a first vertical gradient value of each of the remaining pixels in the video frame M. The computing device 120 may also determine a second horizontal gradient value and a second vertical gradient value of each of the remaining pixels in the video frame corresponding to the sequence number Di. The computing device 120 may determine a first difference value between a first horizontal gradient value of a pixel and a first vertical gradient value of the pixel in the video frame M. The computing device 120 may determine a second difference value between a second horizontal gradient value of a pixel and a second vertical gradient value of the pixel in the video frame corresponding to the sequence number Di. In some embodiments, the computing device 120 may use the first difference values of the remaining pixels in the video frame M and the second difference values of the remaining pixels in the video frame corresponding to the sequence number Di to indicate the third matching degree.

In 728, the computing device 120 may determine whether the third matching degree satisfies a second condition. In some embodiments, the third matching degree may be indicated by the number of pairs of (remaining) pixels having consistent directions. As used herein, if both of the first difference value of a pixel of a pair of (remaining) pixels in the video frame M and the second difference value of the other one of the pair of pixels in the video frame corresponding to the sequence number Di are greater or smaller than 0, the computing device 120 may determine that a gradient direction of the pixel of the pair of (remaining) pixels in the video frame M is consistent with a gradient direction of the other one of the pair of (remaining) pixels in the video frame corresponding to the sequence number Di. Otherwise, the computing device 120 may determine that the gradient direction of the pixel of the pair of (remaining) pixels in the video frame M is not consistent with the gradient direction of the other one of the pair of (remaining) pixels in the video frame corresponding to the sequence number Di. In some embodiments, if the number of pairs of (remaining) pixels having consistent directions exceeds a certain threshold, the computing device 120 may determine that the video frame M matches the video frame corresponding to the sequence number Di. The number of pairs of (remaining) pixels having consistent directions may be expressed by the ratio of the pairs of (remaining) pixels having consistent directions to all the pairs of (remaining) pixels. The certain threshold may be any value, such as, 60%, 70%, 80%, 90%, etc. In response to the determination that the third matching degree satisfies the second condition, the process 700 may proceed to 736. In response to the determination that the third matching degree does not satisfy the second condition, the process 700 may proceed to 730.

In 730, the computing device 120 may determine whether the sequence number Di is smaller than Ds. In response to the determination that the sequence number Di is smaller than Ds, the process 700 may proceed to 732. Otherwise, the process 700 may proceed to 734.

In 732, the computing device 120 may retrieve a video frame corresponding to the sequence number Di+1. Then, the process 700 may return to operation 726 to determine a third matching degree between the video frame M and the retrieved video frame Di+1.

In 734, the computing device 120 may extract the video frame M. The computing device 120 may assign the video frame M with the video frame label VF-S+1. The computing device 120 may also assign the video frame with a preset position label-Q+1, which is a new preset position label. After operation 734, the computing device 120 may retrieve a next video frame and the process 700 may return back to operation 706.

In 736, the computing device 120 may extract the video frame M. The computing device 120 may assign the video frame M with the video frame label VF-S+1. The computing device 120 may also assign the video frame with the same preset position label as the video frame corresponding to the sequence number Di. After operation 736, the computing device 120 may retrieve a next video frame and the process 700 may return back to operation 706.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations may be added in the exemplary process 700 as illustrated in FIG. 7. Examples of such operations may include obtaining or determining the third threshold, the fourth threshold, the fifth threshold, the sixth threshold, the seventh threshold, the first condition, the second condition, etc. As another example, an operation of determining a brightness level of a normal video frame may be added between operation 708 and operation 710. Specifically, referring to operation 708, the computing device 120 may discard a pair of pixels whose difference value is greater than or equal to the fourth threshold. The computing device 120 may obtain the remaining pixels in the video frame (e.g., the video frame M). In some embodiments, the computing device 120 may further determine a brightness level of the video frame based on the remaining pixels in the video frame. For example, if the mean value of the pixel values of the remaining pixels in the video frame is lower than a first brightness threshold, the video frame may be regarded as having a brightness level of level-1. If the mean value of the pixel values of the remaining pixels in the video frame is greater than a second brightness threshold, the video frame may be regarded as having a brightness level of level-3. If the mean value of the pixel values of the remaining pixels in the video frame is greater than or equal to the first brightness threshold and is lower than or equal to the second brightness threshold, the video frame may be regarded as having a brightness level of level-2. In some embodiments, the first brightness threshold and/or the second brightness threshold may be set by a user or automatically determined by the computing device 120.

Figure 9:
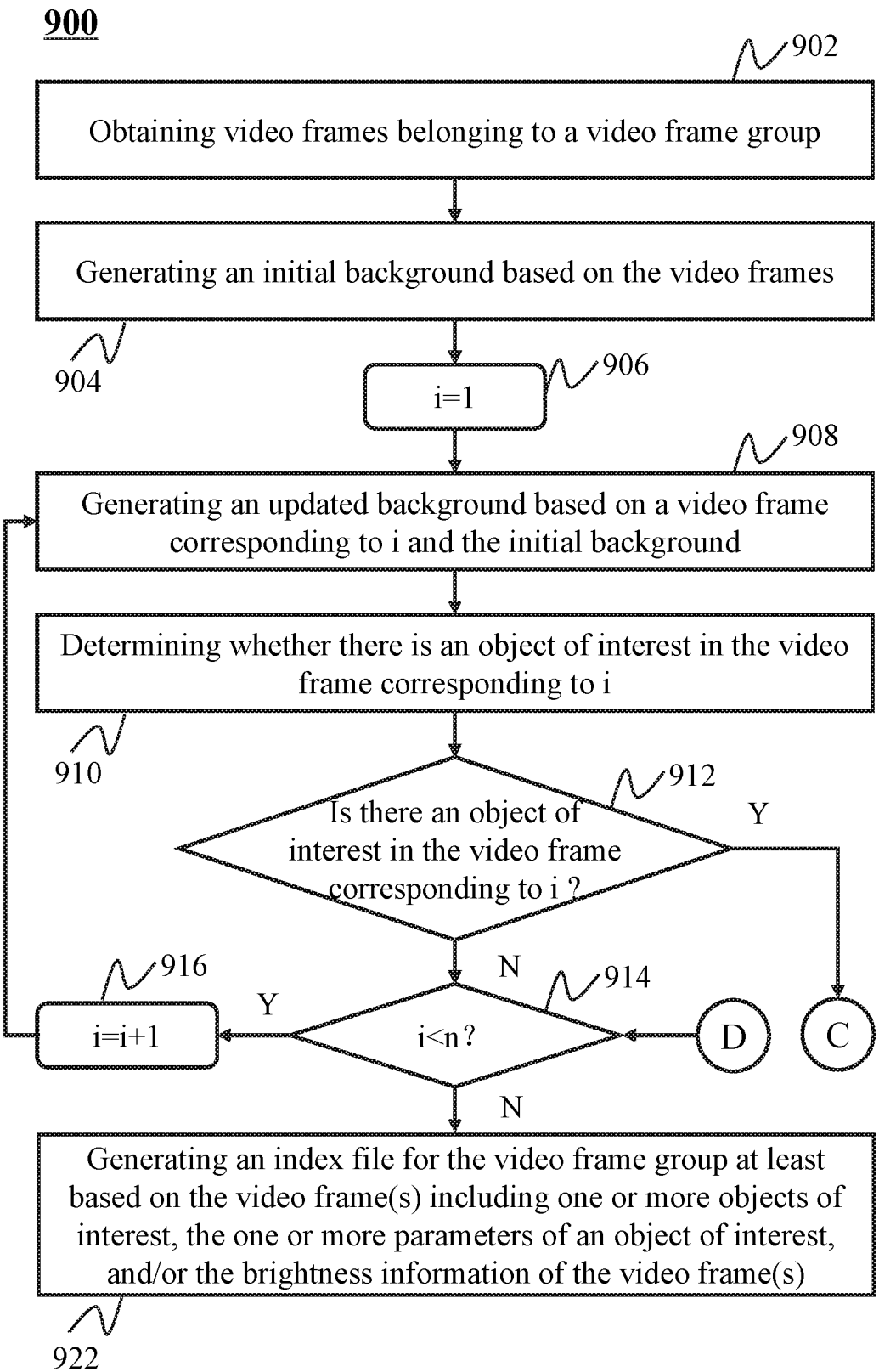
FIG. 9 and FIG. 10 are flowcharts illustrating an exemplary process 900 for determining an index file for a video frame group according to some embodiments of the present disclosure.
Figure 10:
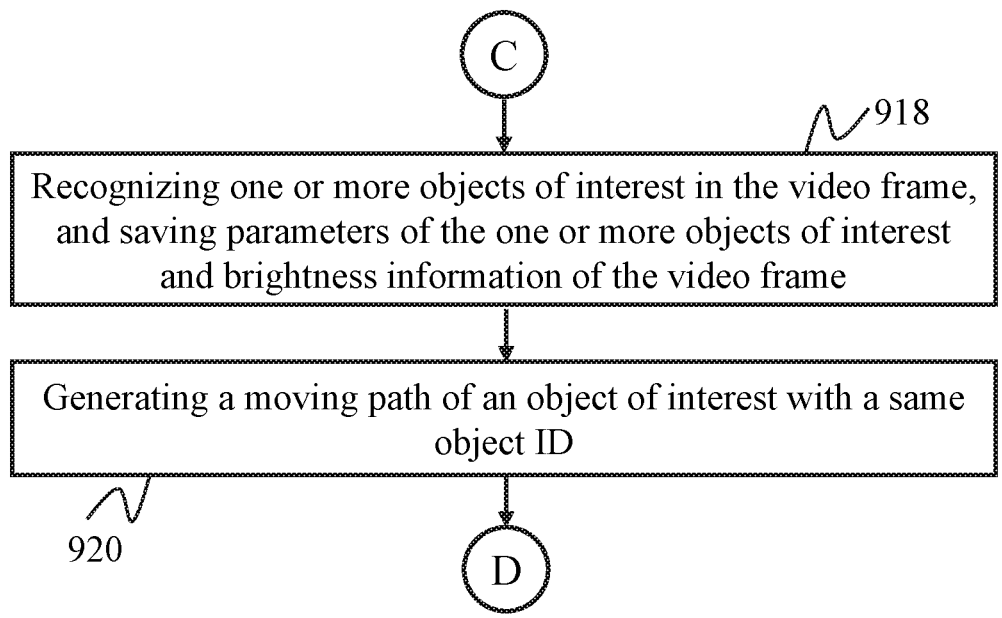

FIG. 9 and FIG. 10 are flowcharts illustrating an exemplary process 900 for determining an index file for a video frame group according to some embodiments of the present disclosure. In some embodiments, at least part of the process 900 may be performed by the computing device 120 (implemented in, for example, the computing device 200 shown in FIG. 2). For example, the process 900 may be stored in a storage device (e.g., the storage 130, the storage 390, etc.) in the form of instructions (e.g., an application), and invoked and/or executed by the computing device 120 (e.g., the computing device 200 as illustrated in FIG. 2, the mobile device 300 as illustrated in FIG. 3). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and FIG. 10 and described below is not intended to be limiting. In some embodiments, the operation 540 may be performed according to the process 900.

In some embodiments, the process 900 may be performed after the process 600 or the process 700 is completed. For example, after the computing device 120 determine all the preset position labels for all the normal video frame according to the process 600 or the process 700, the computing device 120 may further perform the process 900 to generate an index file for each video frame group. In some embodiments, the process 900 may be performed simultaneously with the process 600 or the process 700. For example, one or more operations of the process 900 (e.g., the operation of determining an object of interest, or the operation of generating a background) may be performed immediately after determining the preset position label for each normal video frame (e.g., between the operation 712 and the operation 706, or between the operation 720 and the operation 706, or between the operation 734 and the operation 706, or between the operation 736 and the operation 706).

In 902, the computing device 120 may obtain video frames belonging to a video frame group. The video frames belonging to a video frame group may have a same preset position label. For brevity, the video frames belonging to a video frame group may all have the preset position label-Q.

In 904, the computing device 120 may generate an initial background based on the video frames belonging to the video frame group. In some embodiments, each of the video frames belonging to the video frame group may have a series number of $FG_i$, i=1, 2, . . . , n. For any two successive video frames, e.g., video frame $FG_k$ and video frame $FG_{k+1}$, the computing device 120 may calculate difference values between a plurality of pairs of pixels in the video frame $FG_k$ and the video frame $FG_{k+1}$. Each pair of pixels may include two pixels with a same pixel coordinate respectively in the video frame $FG_k$ and the video frame $FG_{k+1}$. The computing device 120 may determine a background associated with the video frame $FG_k$ and the video frame $FG_{k+1}$ based on the difference values between the plurality of pairs of pixels in the video frame $FG_k$ and the video frame $FG_{k+1}$. Specifically, a pixel B (i, j) in the background associated with the video frame $FG_k$ and the video frame $FG_{k+1}$ may be same as the pixel $FG_k$ (i, j) when a difference value between the pixel $FG_k$ (i, j) and the $FG_{k+1}$ (i, j) is lower than a threshold T. Otherwise, the value of the pixel B (i, j) in the background associated with the video frame $FG_k$ and the video frame $FG_{k+1}$ may be 0. As used herein, (i, j) may refer to pixel coordinates. Finally, the computing device 120 may obtain n-1 backgrounds associated with every two successive video frames in the video frame group. Then, the computing device 120 may generate the initial background based on the n-1 backgrounds associated with every two successive video frames in the video frame group. For example, each pixel value of the initial background may be the mean pixel value of all pixels with a same pixel coordinate in the n-1 backgrounds.

In 906, the computing device 120 may retrieve a video frame $FG_i$. The video frame $FG_i$ may be a normal video frame and correspond to the preset position label-Q.

In 908, the computing device 120 may generate an updated background based on the video frame $FG_i$ and the initial background. In some embodiments, the computing device 120 may determine an updated pixel value of each pixel in the updated background based on a weighted mean value of a pair of pixels in the video frame $FG_i$ and the initial background. The pair of pixels may include two pixels with a same pixel coordinate respectively in the video frame $FG_i$ and the initial background. In some embodiments, the weighted mean value of the pair of pixels may be a sum of the pixel value of the pixel in the video frame $FG_i$ multiplying a first weight and the pixel value of the other pixel in the initial background multiplying a second weight. The computing device 120 may set the weighted mean value of the pair of pixels as the updated pixel value in the updated background.

In 910, the computing device 120 may determine whether there is an object of interest in the video frame $FG_i$. An object of interest may include a vehicle, a boat, a flying machine, a person, an animal, etc. In some embodiments, the computing device 120 may determine a difference value between the video frame $FG_i$ and the updated background. The difference between the video frame $FG_i$ and the updated background may be represented by a difference value associated with the difference between each pair of pixels in the video frame $FG_i$ and the updated background. If the difference value is greater than an eighth threshold, the computing device 120 may determine that there is an object of interest in the video frame $FG_i$.

In 912, in response to the determination that there is an object of interest in the video frame $FG_i$, the process 900 may proceed to node C which is further illustrated in FIG. 10. In response to the determination that there is no object of interest in the video frame $FG_i$, the process 900 may proceed to 914.

In 914, the computing device 120 may determine whether i is smaller than n. In response to the determination that i is smaller than n, the process 900 may proceed to 916. Otherwise, the process 900 may proceed to 922.

In 916, the computing device 120 may replace the video frame $FG_i$ with a new video frame next to the video frame $FG_i$ (e.g., the video frame $FG_{i+1}$) and repeat the operations 908 to 914 with the new video frame.

Referring to FIG. 10, in 918, the computing device 120 may recognize one or more objects of interest in the video frame $FG_i$. In some embodiments, the computing device 120 may employ multiple techniques to recognize the one or more objects of interest in the video frame $FG_i$. An exemplary recognition technique may include a template matching technique, a trained model (e.g., a model trained by a CNN network), etc. After recognizing the one or more objects of interest, the computing device 120 may save one or more parameters of an object of interest and brightness information of the video frame $FG_i$. The one or more parameters of an object of interest may include the object ID, the location of the object of interest, the moving direction of the object of interest, the type of the object of interest, the color of the object of interest, the size of the object of interest, etc.. The brightness information of the video frame $FG_i$ may indicate a brightness level of the video frame $FG_i$. In some embodiments, the brightness level of the video frame $FG_i$ may be determined based on at least part of pixels in the video frame $FG_i$. Related descriptions of the determination of the brightness level may be found in connection with FIG. 7, and the descriptions thereof.

In 920, the computing device 120 may generate a moving path of an object of interest with a same object ID (e.g., person 1, car 1, bike 2, etc.). The computing device 120 may track the object of interest with the same object ID in different video frames and generate the moving path of the object of interest accordingly. After the operation 920, the process 900 may proceed to node D which is illustrated in FIG. 9. In some embodiments, operation 920 may be performed at the end of the process 900.

In 922, the computing device 120 may generate an index file for the video frame group at least based on the video frame(s) including one or more objects of interest, the one or more parameters of an object of interest, and/or the brightness information of the video frame(s). In some embodiments, the computing device 120 may extract a child index file for each video frame in the video group. The computing device 120 may then generate the index file of the video group by combining the child index file of each video frame in the video group. A child index file of a video frame may at least include time stamp, a preset position label, a background, or brightness information of the video frame. For each video frame containing one or more objects of interest, the child index file may further include one or more parameters corresponding to each of the one or more objects of interest. The one or more parameters corresponding to an object of interest may include the object ID, the location of the object of interest, the moving direction of the object of interest, the type of the object of interest, the color of the object of interest, the size of the object of interest, etc. In some embodiments, the computing device 120 may then group the child index files in each video frame group into different categories. For example, a specific category of child index files in a video frame group may include the child index files that include a same object of interest (e.g., with the same object ID). As such, the child index files in the specific category may be combined to form an index file that indicates a moving path of the object of interest with the same object ID.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations may be added between the operation 914 and the operation 922, or elsewhere in the process 900. Examples of such operations may include combining a child index file of each video frame to generate the index file of the video frame group, etc.

FIG. 11 is a flowchart illustrating an exemplary process for generating a video synopsis according to some embodiments of the present disclosure. In some embodiments, at least part of the process 1100 may be performed by the computing device 120 (implemented in, for example, the computing device 200 shown in FIG. 2). For example, the process 1100 may be stored in a storage device (e.g., the storage 130, the storage 390, etc.) in the form of instructions (e.g., an application), and invoked and/or executed by the computing device 120 (e.g., the computing device 200 as illustrated in FIG. 2, the mobile device 300 as illustrated in FIG. 3). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1110, the computing device 120 may obtain video frames (e.g., $FG_i$, i=1, 2, . . . , n) belonging to a video frame group and the corresponding index file. The corresponding index file may indicate one or more objects of interest, one or more parameters of an object of interest, and/or brightness information (e.g., brightness level) of the video frame(s).

In 1120, the computing device 120 may generate a background to be displayed in a video synopsis based on the video frames (e.g., $FG_i$, i=1, 2, . . . , n) belonging to the video frame group and the corresponding index file. In some embodiments, the computing device 120 may employ different techniques to generate the background to be displayed in a video synopsis. An exemplary technique may include a background modeling technique, a keyframe synthesis technique, etc. In some embodiments, the computing device 120 may designate a video frame without an object of interest as the background to be displayed in the video synopsis. In some embodiments, taking the brightness level of each of the video frames (e.g., $FG_i$, i=1, 2, . . . , n) into consideration, the computing device 120 may determine the brightness level of the background corresponding to each video frame, and perform a fusion operation on the backgrounds with different brightness levels to generate the background to be displayed in the video synopsis. In some embodiments, the computing device 120 may generate two or more backgrounds to be displayed in the video synopsis with different brightness level. The two or more backgrounds with different brightness level may be further used in the video synopsis alternatively to match the objects of interest that are captured under different illuminance.

In 1130, the computing device 120 may superpose one or more objects of interest in the video frame group on the background to be displayed in the video synopsis based on the corresponding index file. In some embodiments, the computing device 120 may determine the one or more objects of interest to be superposed based on a combination of a target box of an object of interest and a foreground mask of the object of interest. The target box of an object may be a box defining an area where the object may appear. If the object of interest has a relatively low area ratio in the box of an object of interest, the computing device 120 may superimpose the corresponding area of the foreground mask of the object of interest on the background. If the area ratio is relatively high, the computing device 120 may superimpose the corresponding area of the target box of the object of interest directly on the background. In some embodiments, the computing device 120 may superpose one or more objects of interest with a same brightness level on the background to be displayed in the video synopsis In 1140, the computing device 120 may generate the video synopsis for the video frame group. In some embodiments, the video synopsis may focus on a specified area related to a preset position label of the video frame group. In some embodiments, the video synopsis may include a plurality of objects of interest in the video frame group. In some embodiments, during the generation of the video synopsis, the computing device 120 may arrange the plurality of objects of interest according to an arrangement rule. The arrangement rule may be a rule under which the plurality of objects of interest are arranged such that the moving paths of the plurality of objects of interest do not overlap with each other, or the plurality of objects of interest in the video synopsis appear simultaneously or successively, or the video synopsis displays as many objects of interest as possible.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations may be added in the process 1100. Examples of such operations may include arranging the one or more objects of interest.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

We claim:

1. A system for generating a video synopsis, comprising:
   at least one storage medium including a set of instructions; and
   at least one processor in communication with the at least one storage medium, wherein when executing the set of instructions, the at least one processor is directed to cause the system to:
   obtain a video captured by a movable camera at a plurality of positions, the video including a sequence of video frames, and the plurality of positions include one or more preset positions, wherein each preset position of the one or more preset positions is identified by a corresponding preset position label;
   for each video frame of at least part of the sequence of video frames,
      in response to determining the corresponding preset position label is associated with the video frame, determine a position label of the video frame based on the corresponding preset position label; and
      in response to determining the corresponding preset position label is not associated with the video frame, determine a position label of the video frame based on another video frame which is associated with a preset position label;
   classify the at least part of the sequence of video frames into a plurality of groups based on their position labels;
   determine one or more objects of interest in at least one of the plurality of groups; and
   generate, for the at least one of the plurality of groups, a video synopsis based on the one or more objects of interest.

2. The system of claim 1, wherein the at least one processor is further directed to cause the system to:
   identify, among the sequence of video frames, one or more abnormal video frames; and
   leave the one or more abnormal video frames without determining their position labels.

3. The system of claim 1, wherein in response to determining the corresponding preset position label is associated with the video frame, to determine the position label of the video frame based on the corresponding preset position label, the at least one processor is directed to cause the system to:
   determine that the video frame includes a position information indicates one of the one or more positions of the movable camera; and
   determine the position label of the video frame based on the position information.

4. The system of claim 3, wherein the position information includes a PTZ (pan/tilt/zoom) parameter of the movable camera.

5. The system of claim 1, wherein in response to determining the corresponding preset position label is not associated with the video frame, to determine the position label of the video frame based on another video frame which is associated with the preset position label, the at least one processor is directed to cause the system to:
   determine a first matching degree between the video frame and a previous video frame with a defined position label; and
   in response to a determination that the first matching degree satisfies a first condition, designate the defined position label of the previous video frame as the position label of the video frame.

6. The system of claim 1, wherein in response to determining the corresponding preset position label is not associated with the video frame, to determine the position label of the video frame based on another video frame which is associated with the preset position label, the at least one processor is directed to cause the system to:
   determine a plurality of second matching degrees between the video frame and a plurality of previous video frames;
   determine a highest matching degree among the plurality of second matching degrees, the highest matching corresponding to a target video frame among the plurality of previous video frames; and
   in response to a determination that the highest matching degree is greater than a threshold, designate a position label of the target video frame as the position label of the video frame.

7. The system of claim 1, wherein in response to determining the corresponding preset position label is not associated with the video frame, to determine the position label of the video frame based on another video frame which is associated with the preset position label, the at least one processor is directed to cause the system to:
   designate a distinctive position label with respect to one or more previous position labels of one or more previous video frames as the position label of the video.

8. The system of claim 1, wherein to classify the at least part of the sequence of video frames into a plurality of groups, the at least one processor is directed to cause the system to:
   classify one or more video frames with a same position label into one group, or classify one or more video frames whose position labels are close to each other into one group.

9. The system of claim 1, wherein to generate, for the at least one of the plurality of groups, a video synopsis based on the one or more objects of interest, the at least one processor is directed to cause the system to:
   generate one or more background images from the at least one of the plurality of groups, the one or more background images having different brightness levels; and
   superpose the one or more objects of interest on the one or more background images to generate the video synopsis.

10. The system of claim 9, wherein to superpose the one or more objects of interest on the one or more background images to generate the video synopsis, the at least one processor is directed to cause the system to:
    extract the one or more objects of interest with a target box or a foreground mask; and
    superpose an area corresponding to the target box or the foreground mask on the one or more background images.

11. A method for generating a video synopsis implemented on a computing device having at least one processor and a non-transitory storage medium, the method comprising:
    obtaining a video captured by a movable camera at a plurality of positions, the video including a sequence of video frames, and the plurality of positions include one or more preset positions, wherein each preset position of the one or more preset positions is identified by a corresponding preset position label;

for each video frame of at least part of the sequence of video frames, in response to determining the corresponding present position label is associated with the video frame, determining a position label of the video frame based on the corresponding preset position label; and in response to determining the corresponding preset position label is not associated with the video frame, determining a position label of the video frame based on another video frame which is associated with a preset position label;

classifying the at least part of the sequence of video frames into a plurality of groups based on their position labels;

determining one or more objects of interest in at least one of the plurality of groups; and generating, for the at least one of the plurality of groups, a video synopsis based on the one or more objects of interest.

12. The method of claim 11, for each video frame of at least part of the sequence of video frames, wherein in response to determining the corresponding present position label is associated with the video frame, the determining a position label of the video frame based on the corresponding preset position label further includes:

determining that the video frame includes a position information indicates one of the one or more positions of the movable camera; and determining the position label of the video frame based on the position information.

13. The method of claim 12, wherein the position information includes a PTZ parameter of the movable camera.

14. The method of claim 11, for each video frame of at least part of the sequence of video frames, wherein in response to determining the corresponding preset position label is not associated with the video frame, the determining a position label of the video frame based on another video frame which is associated with a preset position label includes:

determining a first matching degree between the video frame and a previous video frame with a defined position label; and in response to a determination that the first matching degree satisfies a first condition, designating the defined position label of the previous video frame as the position label of the video frame.

15. The method of claim 11, for each video frame of at least part of the sequence of video frames, wherein in response to determining the corresponding preset position label is not associated with the video frame, the determining of a position label of the video frame based on another video frame which is associated with a preset position label includes:

determining a plurality of second matching degrees between the video frame and a plurality of previous video frames;

determining a highest matching degree among the plurality of second matching degrees, the highest matching corresponding to a target video frame among the plurality of previous video frames; and in response to a determination that the highest matching degree is greater than a threshold, designating a position label of the target video frame as the position label of the video frame.

16. The method of claim 11, for each video frame of at least part of the sequence of video frames, wherein in response to determining the corresponding preset position label is not associated with the video frame, the determining a position label of the video frame based on another video frame which is associated with a preset position label includes:

designating a distinctive position label with respect to one or more previous position labels of one or more previous video frames as the position label of the video frame.

17. The method of claim 11, wherein the classifying of the at least part of the sequence of video frames into a plurality of groups includes:

classifying one or more video frames with a same position label into one group, or classifying one or more video frames whose position labels are close to each other into one group.

18. The method of claim 11, for the at least one of the plurality of groups, wherein the generating of a video synopsis based on the one or more objects of interest includes:

generating one or more background images from the at least one of the plurality of groups, the one or more background images having different brightness levels; and superposing the one or more objects of interest on the one or more background images to generate the video synopsis.

19. The method of claim 18, wherein the superposing of the one or more objects of interest on the one or more background images to generate the video synopsis includes:

extracting the one or more objects of interest with a target box or a foreground mask; and superposing an area corresponding to the target box or the foreground mask on the one or more background images.

20. A non-transitory computer readable medium comprising executable instructions that, wherein when executed by at least one processor, the executable instructions cause the at least one processor to effectuate a method comprising:

obtaining a video captured by a movable camera at a plurality of positions, the video including a sequence of video frames, and the plurality of positions include one or more preset positions, wherein each preset position of the one or more preset positions is identified by a corresponding preset position label;

for each video frame of at least part of the sequence of video frames, in response to determining the corresponding present position label is associated with the video frame, determining a position label of the video frame based on the corresponding preset position label; and in response to determining the corresponding preset position label is not associated with the video frame, determining a position label of the video frame based on another video frame which is associated with a preset position label;

classifying the at least part of the sequence of video frames into a plurality of groups based on their position labels;

determining one or more objects of interest in at least one of the plurality of groups; and generating, for the at least one of the plurality of groups, a video synopsis based on the one or more objects of interest.

* * * * *